US012178770B2

(12) United States Patent
Laflamme et al.

(10) Patent No.: US 12,178,770 B2
(45) Date of Patent: Dec. 31, 2024

(54) SHOCK ABSORBING ASSEMBLY FOR A PATIENT SUPPORT APPARATUS

(71) Applicant: UMANO MEDICAL INC., L'Islet (CA)

(72) Inventors: Jimmy Laflamme, Lévis (CA); Jérôme Marcotte, Lévis (CA); Mathieu Mercier, Lévis (CA); Jérôme Gosselin, Lévis (CA); Esther Berthelot, Magog (CA); Frédérik Lévesque, Lévis (CA); Ahmed Atoubi, Saint-Nicolas (CA)

(73) Assignee: UMANO MEDICAL INC., L'Islet (CA)

( * ) Notice: Subject to any disclaimer, the term of this patent is extended or adjusted under 35 U.S.C. 154(b) by 212 days.

(21) Appl. No.: 18/058,206

(22) Filed: Nov. 22, 2022

(65) Prior Publication Data

US 2023/0098355 A1 Mar. 30, 2023

Related U.S. Application Data

(63) Continuation of application No. 16/760,900, filed as application No. PCT/IB2018/058586 on Nov. 1, 2018, now Pat. No. 11,510,832.

(Continued)

(51) Int. Cl.
*A61G 7/00* (2006.01)
*A61G 7/018* (2006.01)
*A61G 7/05* (2006.01)

(52) U.S. Cl.
CPC ........... *A61G 7/018* (2013.01); *A61G 7/0506* (2013.01); *A61G 7/0528* (2016.11); *A61G 2200/16* (2013.01)

(58) Field of Classification Search
CPC .......... A61G 7/00; A61G 7/002; A61G 7/018; A61G 7/015; A61G 7/0528; A61G 7/0506; A61G 2200/16
See application file for complete search history.

(56) References Cited

U.S. PATENT DOCUMENTS 6,324,709 B1 12/2001 Ikeda et al.
6,978,501 B2 12/2005 Vrzalik
(Continued)

OTHER PUBLICATIONS

International Search Report and Written Opinion for PCT/IB2018/058586 mailed Feb. 7, 2019, 10 pages.

*Primary Examiner* — Fredrick C Conley
(74) *Attorney, Agent, or Firm* — STEPTOE LLP; Scott Richey

(57) ABSTRACT

A patient support apparatus comprising: a frame; a patient receiving surface supported on the frame, the patient supporting surface comprising a central panel section and a side panel section adapted to selectively extend towards to and away from the central panel section for adjusting a width of the patient supporting surface; a board supported on the frame, the board comprising a base comprising a sleeve and an extension member slidably received in the sleeve and a coil spring mounted to the extension member. The extension member is extendable laterally towards to and away from the sleeve for adjusting a width of the base and the coil spring is adapted to counteract an external force applied to the outer end of the extension member. The board comprises a vertical panel that is movable to follow movement of the extension member laterally towards and away from the sleeve.

46 Claims, 22 Drawing Sheets

Related U.S. Application Data

(60) Provisional application No. 62/580,109, filed on Nov. 1, 2017.

(56) References Cited

U.S. PATENT DOCUMENTS

| | | | | |
|---|---|---|---|---|
| 7,419,019 | B1 | 9/2008 | White et al. | |
| 8,104,122 | B2 | 1/2012 | Richards et al. | |
| 2003/0079289 | A1 | 5/2003 | Vrzalik | |
| 2006/0195984 | A1* | 9/2006 | HakamiuN | A61G 7/0514 5/430 |
| 2007/0136949 | A1 | 6/2007 | Richards et al. | |
| 2010/0005592 | A1* | 1/2010 | Poulos | A61G 7/0509 5/613 |
| 2014/0215717 | A1 | 8/2014 | Rigsby et al. | |
| 2015/0047641 | A1* | 2/2015 | Frey | A62B 23/06 128/206.11 |
| 2015/0128347 | A1 | 5/2015 | Hutchison et al. | |

* cited by examiner

SHOCK ABSORBING ASSEMBLY FOR A PATIENT SUPPORT APPARATUS

CROSS REFERENCE TO RELATED APPLICATION

The application is a continuation application of U.S. application Ser. No. 16/760,900 filed on Apr. 30, 2020 (now U.S. Pat. No. 11,510,832), which is a 371 of International Application PCT/IB2018/058586 filed on Nov. 1, 2018, claiming priority upon U.S. provisional Application 62/580,109 filed on Nov. 1, 2017, these applications being incorporated herein by reference.

FIELD

The invention relates to shock absorbing assemblies, and more specifically to shock absorbing assemblies for a patient support apparatus.

BACKGROUND

Patient support apparatuses such as hospital beds are provided in various sizes and shapes. Bariatric beds, which are larger than normal beds, may be used for the treatment of overweight or oversized patients. They can also be used for parents who want to get closer to their child or for spouse or partner who want to be close to a loved one in terminal stage of a disease and comfort them by lying with them on the bed, in delivery rooms to increase the mother's comfort by giving her more space, etc.

To improve maneuverability of bariatric beds and/or to allow bariatric beds to pass through relatively narrow doorways or passages, it may be desirable to provide a hospital bed having a width which is adjustable. For example, the bed could normally have a width which corresponds to the width of a bariatric bed, and the width could be reduced to allow the bed to pass through as narrow doorway. The width of the bed could also be set to one of various predetermined widths, or to a width within a predetermined range depending on the size of the patient or of the type of treatment provided to the patient.

To allow the bed's width to be adjusted, the bed can include at least one central section and at least one side section connected to the central section and adapted to move towards and away from the central section to thereby increase or decrease the bed's width.

To move the side sections relative to the central section, one or more of the side sections may be coupled to an actuator. The side sections may further be interconnected with each other via a transmission assembly such that lateral movement of a single side section may cause movement of at least one other, or even all, lateral sections.

It will be appreciated that the side section are therefore movable components of the bed and that an external force applied on the side sections may damage the actuator and/or the transmission assembly may be damaged.

In some width-adjustable bariatric bed, the width of the headboard and/or footboard may also be adjustable. In this case, when the headboard and/or footboard is extended, an external force applied near the outer ends of the headboard and/or footboard may create a moment and cause bending in the headboard and/or footboard, thereby damaging the headboard and/or footboard.

There is therefore a need for a system which would overcome at least one of the above-identified drawbacks.

SUMMARY

According to a broad aspect, there is provided a patient support apparatus comprising a frame and a patient receiving surface supported on the frame. The patient supporting surface includes at least one body support panel, each body support panel including a central panel section and at least one lateral panel section adapted to selectively extend towards and away from the central panel section for adjusting a width of the patient supporting surface. According to this broad aspect, the patient support apparatus also comprises at least one resilient element disposed between the at least one lateral panel section and the central panel section for damping movement of the lateral panel section relative to the central panel section.

In one feature, the patient support apparatus further includes a movement transmission assembly, the movement transmission assembly including at least one transmission member connecting at least two of the side panel sections for laterally moving at least one of the side panel sections when another one of the side panel sections is moved.

In another feature, the movement transmission assembly includes a main side panel section of one of the at least one body support panels and a plurality of additional side panel sections of another one of the at least one body support panels operatively connected to the main side panel section via a first transmission member to allow the plurality of additional panel sections to move towards or away from their respective central panel sections when the central panel section is moved.

In still another feature, the main side panel section is connected to an actuator secured to the frame. Preferably, the actuator includes a housing secured to the frame and a threaded rod threadably coupled to the housing such that rotation of the threaded rod causes longitudinal movement of the rod.

In a further feature, the at least one resilient element includes at least one coil spring.

In still a further feature, the at least one resilient element includes a first coil spring and a second coil spring. Preferably, in this feature, an abutment ring is secured to the extension shaft or the threaded rod and the first coil spring is sandwiched between a first wall of the base casing and the abutment ring, and the second coil spring is sandwiched between the abutment ring and a second wall of the base casing parallel to the first wall.

In yet a further feature, the bed further includes a stop circuit adjacent the extension shaft or the threaded rod. In one feature, the stop circuit includes a first limit switch disposed between the abutment ring and the first wall of the base casing and a second limit switch disposed between the abutment ring and the second wall of the base casing. In this feature, both limit switches are preferably adapted to be triggered by the abutment ring.

In another feature, a first ring and a second ring are secured to the extension shaft or the threaded rod and the coil spring is sandwiched between the first ring and the second ring.

In still another feature, the bed further includes a stop circuit adjacent the extension shaft or the threaded rod. Preferably, in this feature, the stop circuit includes a first limit switch operable by the first ring and a second limit switch operable by the second ring.

According to another broad aspect, there is provided a patient support apparatus comprising a frame, a patient receiving surface supported on the frame and a board supported on the frame. The board comprises a base including a central sleeve and at least one extension member slidably received in the central sleeve, the extension member being extendable laterally towards and away from the central sleeve to thereby respectively decrease and increase the width of the base.

In one feature, the base comprises a central sleeve and a pair of extension members, the extension members being extendable laterally towards and away from the central sleeve in opposite directions.

In another feature, the at least one extension member includes an inner end located towards the central sleeve and an outer end located away from the central sleeve.

In yet another feature, the board further comprises a vertical panel mounted to the base. Preferably, the vertical panel comprises at least one slidable section, the at least one slidable section being mounted to the at least one extension member and being slidably movable to follow the movement of the at least one extension members being extended laterally towards and away from the central sleeve.

In still another feature, the base further comprises at least one resilient member operatively connected to the at least one extension member near the inner end thereof. Preferably, the at least one resilient member includes a coil spring having a central axis disposed orthogonally to the extension member. More preferably, the at least one resilient member further comprises a housing in which is housed the coil spring, the housing from the central sleeve proximal to an outer end thereof. Even more preferably, the at least one resilient member further comprises a sliding base operatively mounted to one end of the coil spring, the sliding base being adapted for sliding along the at least one extension member when the at least one extension member moves laterally within the central sleeve.

In one feature, the board is selected from a group consisting of a headboard and a footboard.

According to another broad aspect, there is provided a patient support apparatus comprising a frame and at least one wheel assembly supporting the frame. The wheel assembly comprises a base to which is rotatably mounted at least one wheel, the base including a mounting portion for operatively mounting the wheel base to the frame. The mounting portion includes at least one resilient element configured for absorbing vertical shocks transmitted either from the at least one wheel or from the frame.

According to another broad aspect, there is provided a safety mechanism for a patient support apparatus including a frame and a patient receiving surface supported on the frame, the patient supporting surface including at least one body support panel, each body support panel including a central panel section and at least one lateral panel section adapted to selectively extend towards and away from the central panel section for adjusting a width of the patient supporting surface.

In this aspect, the safety mechanism comprises: at least one resilient element disposed between the at least one lateral panel section and the central panel section for damping movement of the lateral panel section relative to the central panel section; a means for urging movement of the at least one lateral panel section toward and away from the central panel; and a stop circuit operatively coupled to the at least one resilient element, the stop circuit being configured to interrupt the operation of the means for urging movement when an extension movement of the at least one lateral panel section toward or away from the central section is restricted.

In one feature, the patient support apparatus is selected from a group consisting of a long term care beds, a stretcher, a gurney and a hospital bed.

In another feature, the hospital bed comprises a bariatric bed.

In accordance with a broad aspect, there is provided a patient support apparatus comprising: a frame; a patient receiving surface supported on the frame, the patient supporting surface comprising a central panel section and a side panel section adapted to selectively extend towards to and away from the central panel section for adjusting a width of the patient supporting surface; a board supported on the frame, the board comprising a base comprising a sleeve and an extension member slidably received in the sleeve, wherein the sleeve comprises an outer end, and wherein the extension member comprises an inner end located towards to the sleeve and an outer end located away from the sleeve; a housing mounted to the extension member adjacent the outer end of the sleeve; a coil spring mounted in the housing; and a support element that connects the coil spring to the extension member; wherein the extension member is extendable laterally towards to and away from the sleeve for adjusting a width of the base; and wherein the coil spring is adapted to counteract an external force applied to the outer end of the extension member.

In accordance with another broad aspect, there is provided a patient support apparatus comprising: a frame; a patient receiving surface supported on the frame, the patient supporting surface comprising a central panel section and a side panel section adapted to selectively extend towards to and away from the central panel section for adjusting a width of the patient supporting surface; a board supported on the frame, the board comprising a base comprising a sleeve and an extension member slidably received in the sleeve, wherein the sleeve comprises an outer end, and wherein the extension member comprises an inner end located towards to the sleeve and an outer end located away from the sleeve; a housing mounted to the extension member adjacent the outer end of the sleeve; a coil spring mounted in the housing; and a support element that connects the coil spring to the extension member; wherein the extension member is extendable laterally towards to and away from the sleeve for adjusting a width of the base; wherein the extension member has an outer cross-section that is slightly smaller than an inner cross-section of the sleeve; and wherein, when an external force is applied to the outer end of the extension member, a slight angular movement of the extension member relative to the sleeve is allowed while the coil spring counteracts the external force.

In the following aspects, the coil spring extends along an axis intersecting the extension member and from a proximal end to distal end away from the extension member; the support element comprises a sliding base mounted to the proximal end of the coil spring, the sliding base being adapted to slide along the extension member when the extension member moves laterally within the sleeve; the support element comprises a pin extending through the coil spring, the apparatus comprises a base casing comprising a housing secured to the frame, a threaded rod threadably coupled to the housing such that rotation of the threaded rod causes lateral movement of the side panel section relative to the central panel section, first and second coil springs mounted to the threaded rod for damping movement of the side panel section relative to the central panel section and an abutment ring mounted to the threaded rod, wherein the first coil spring is sandwiched between a first wall of the base casing and the abutment ring and wherein the second coil spring is sandwiched between the abutment ring and a second wall of the base casing parallel to the first wall; the side panel section is a first side panel section located at a first side of the central panel section and wherein the patient support assembly comprises a second side panel section located at a second side of the central panel section and a movement transmission assembly, the movement transmission assembly comprising a transmission member connecting the first and second side panel sections for laterally moving the first and second side panel sections towards to or away from the central panel section; the central panel section is a first central panel section, wherein the patient support assembly comprises a second central panel section, a third side panel section located at a first side of the second central panel section and a fourth side panel section located at a second side of the second central panel section, and wherein the transmission member connects the third and fourth side panel sections for laterally moving the third and fourth side panel sections towards to or away from the second central panel section; the extension member has an outer cross-section that is slightly smaller than an inner cross-section of the sleeve and wherein a slight angular movement of the extension member relative to the sleeve is allowed while the coil spring counteracts the external force applied to the outer end of the extension member; the board comprises a vertical panel mounted to the base, the vertical panel being movable to follow movement of the extension member laterally towards to and away from the sleeve; the extension member is a first extension member and wherein the patient support apparatus comprises a second extension member, the first and second extension members being extendable laterally towards to and away from the sleeve in opposite directions; and the board comprises a first vertical panel mounted to the first extension member and being movable to follow movement of the first extension member towards to and away from the sleeve and a second vertical panel mounted to the second extension member and being movable to follow movement of the second extension member towards to and away from the sleeve for adjusting a width of the board.

In accordance with a further broad aspect, there is provided a patient support apparatus comprising: a frame; a patient receiving surface supported on the frame, the patient supporting surface comprising a central panel section and first and second side panel sections adapted to selectively extend towards to and away from the central panel section for adjusting a width of the patient supporting surface; and a board supported on the frame, the board comprising a base and a vertical panel mounted to the base, the base comprising a sleeve and an extension member slidably received in the sleeve, wherein the sleeve comprises an outer end, and wherein the extension member comprises an inner end located towards to the sleeve and an outer end located away from the sleeve; wherein the extension member is extendable laterally towards to and away from the sleeve for adjusting a width of the base; and wherein the vertical panel is movable to follow movement of the extension member towards to and away from the sleeve for adjusting a width of the board.

In the following aspects, the extension member is a first extension member and wherein the patient support apparatus comprises a second extension member, the first and second extension members being extendable laterally towards to and away from the sleeve in opposite directions; the vertical panel is a first vertical panel mounted to the first extension member and being movable to follow movement of the first extension member towards to and away from the sleeve, and wherein the patient support apparatus comprises a second vertical panel mounted to the second extension member and being movable to follow movement of the second extension member towards to and away from the sleeve for adjusting a width of the board; wherein a lateral movement of the first and second panel sections towards to and away from the central panel corresponds to a lateral movement of the first and second vertical panels towards to and away from the sleeve; wherein a lateral movement of the first and second panel sections towards to and away from the central panel is simultaneous to a lateral movement of the first and second vertical panels towards to and away from the sleeve; the apparatus comprises a housing mounted to the extension member adjacent the outer end of the sleeve, a coil spring mounted in the housing and a support element that connects the coil spring to the extension member, the coil spring being adapted to counteract an external force applied to the outer end of the extension member; and the extension member has an outer cross-section that is slightly smaller than an inner cross-section of the sleeve, and wherein, when the external force is applied to the outer end of the extension member, a slight angular movement of the extension member relative to the sleeve is allowed while the coil spring counteracts the external force.

In accordance with a further broad aspect, there is provided a patient support apparatus comprising: a frame; a patient receiving surface supported on the frame; and a board supported on the frame, the board comprising a base comprising a sleeve and first and second extension members slidably received in the sleeve, a first vertical panel mounted to the first extension member and being movable to follow movement of the first extension member towards to and away from the sleeve and a second vertical panel mounted to the second extension member and being movable to follow movement of the second extension member towards to and away from the sleeve for adjusting a width of the board.

In the following aspects, the apparatus comprises a first housing mounted to the first extension member adjacent the first end of the sleeve, a second housing mounted to the second extension member adjacent the second end of the sleeve, a first coil spring mounted in the first housing and a first support element that connects the first coil spring to the first extension member, and a second coil spring mounted in the second housing and a second support element that connects the second coil spring to the second extension member, wherein the first coil spring is adapted to counteract an external force applied to the first outer end of the first extension member and/or wherein the second coil spring is adapted to counteract an external force applied to the second outer end of the second extension member; and the board is a headboard or a footboard or the board is a headboard, wherein the patient support apparatus comprises a footboard comprising a foot base comprising a foot sleeve and first and second foot extension members slidably received in the foot sleeve, a first vertical foot panel mounted to the first foot extension member and being movable to follow movement of the first foot extension member towards to and away from the foot sleeve and a second foot vertical panel mounted to the second foot extension member and being movable to follow movement of the second foot extension member towards to and away from the foot sleeve for adjusting a width of the footboard.

Further details of the invention and its advantages will be apparent from the detailed description included below.

DETAILED DESCRIPTION OF EMBODIMENTS

Variants, examples and preferred embodiments of the invention are described hereinbelow. In the following description of the embodiments, references to the accompanying drawings are by way of illustration of an example by which the invention may be practiced. It will be understood that other embodiments may be made without departing from the scope of the invention disclosed.

Figure 1A:
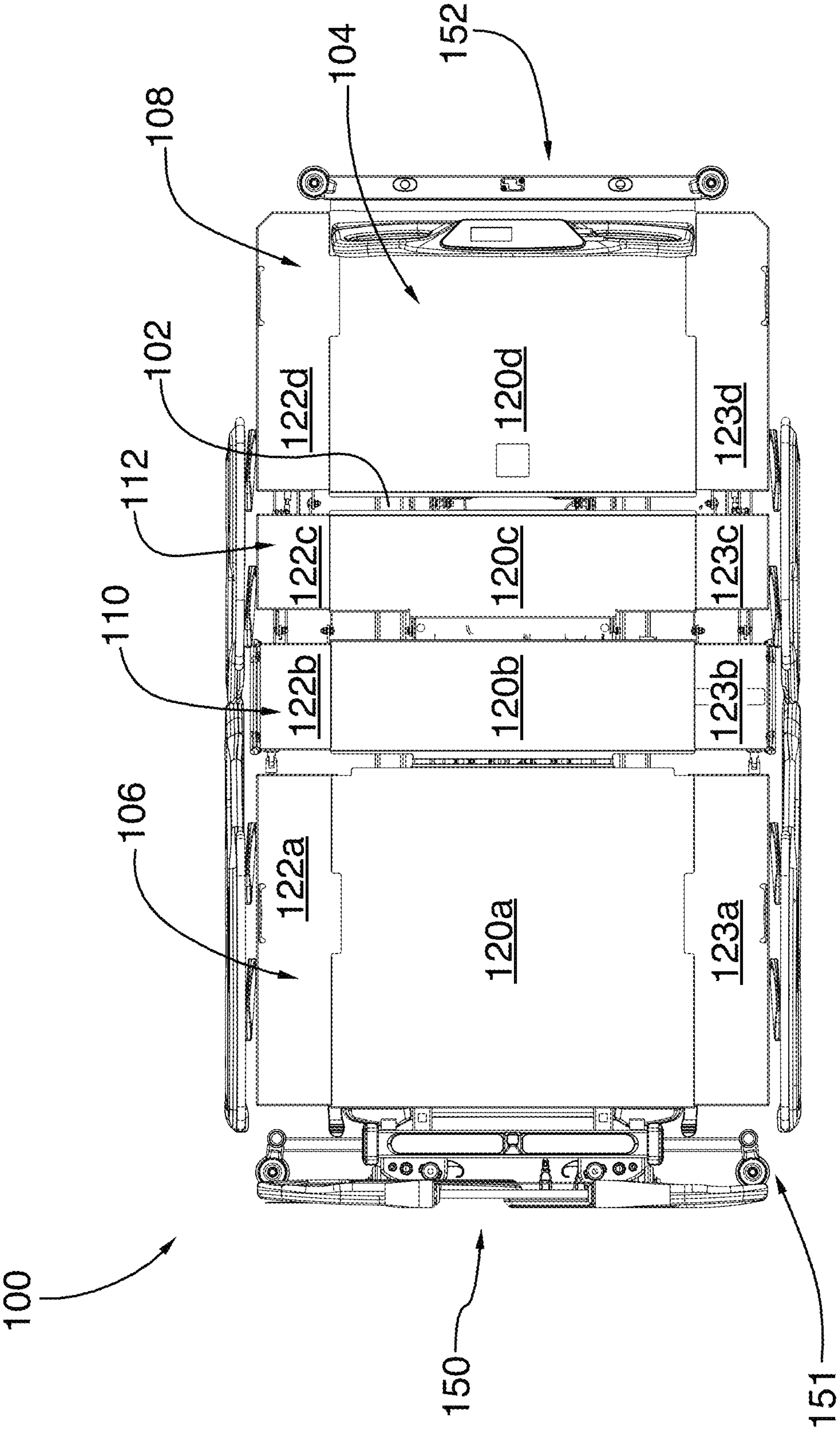
FIG. 1A is a top view of a hospital bed with adjustable width, in accordance with one embodiment, showing the bed in an extended position.
Figure 1B:
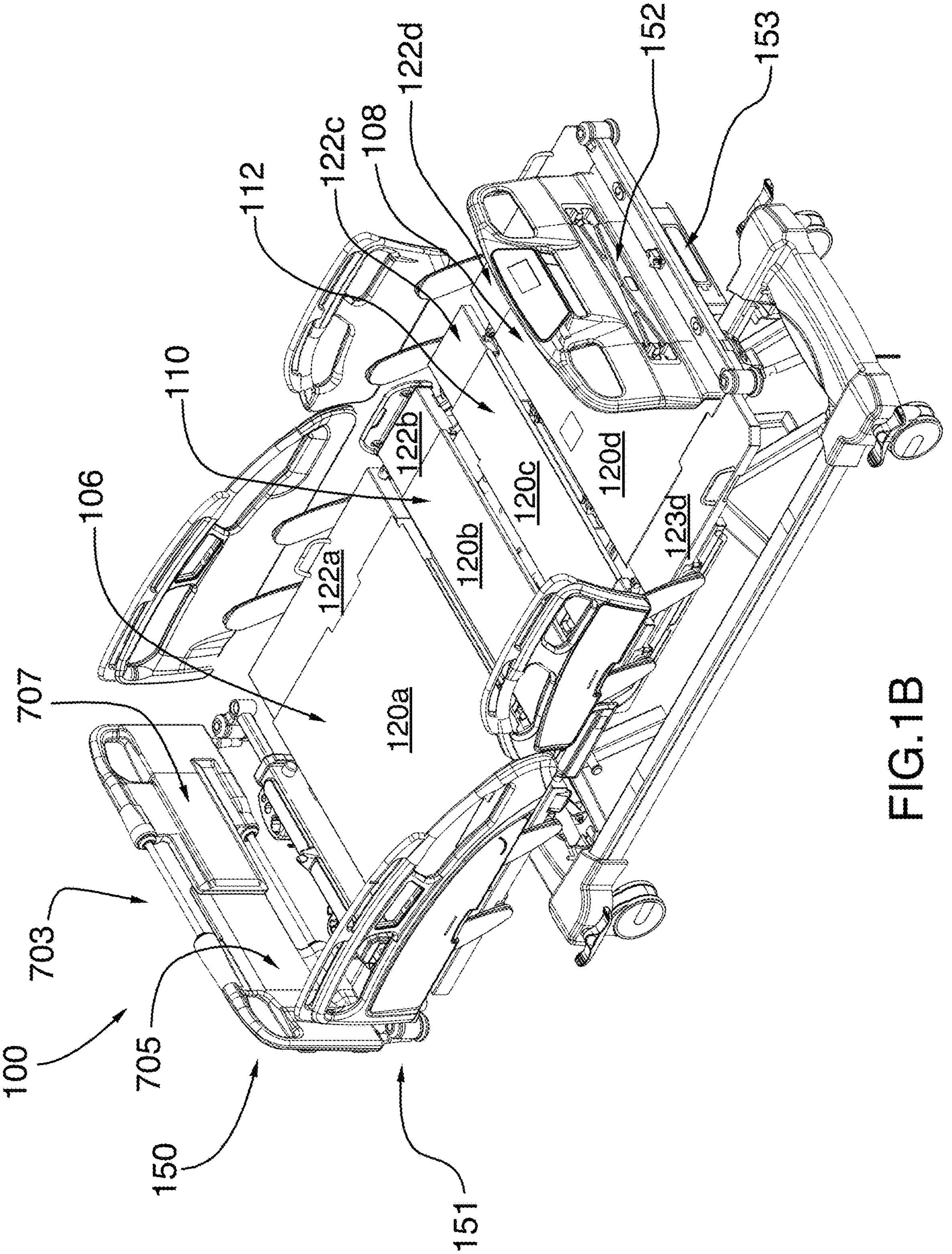
FIG. 1B is a top, right perspective view of the hospital bed shown in FIG. 1A.

Referring first to FIGS. 1 and 2, there is provided a hospital bed 100, in accordance with one embodiment. In this embodiment, the hospital bed 100 is a bariatric bed and includes a frame 102 and a patient support surface 104 supported by the frame 102 for receiving a lying surface such as a mattress, not shown, on which a patient may be placed.

In the illustrated embodiment, the patient support surface 104 includes a plurality of body support panels which are distinct from each other and are adapted to be angled relative to each other. Specifically, the patient support surface 104 includes an upper body support panel or backrest 106, a lower body support panel 108 and first and second core support panels 110, 112 located between the backrest 106 and the lower body support panel 108. More specifically, the first core support panel 110 is located adjacent the backrest 106 and the second core support panel 112 is located adjacent the lower body support panel 108.

Still referring to FIGS. 1 and 2, the width of the patient support surface 104 is adjustable. Specifically, each one of the backrest 106, the lower body support panel 108 and the first and second core support panels 110, 112 includes a central panel section **120*a*-120*d* and a pair of opposite side panel sections 122*a*-122*d* and 123*a*-123*d*, which are selectively movable towards and away from the central panel sections 120*a*-120*d* to thereby respectively decrease or increase the width of the bed 100**.

Alternatively, each one of the backrest 106, the lower body support panel 108 and the first and second core support panels 110, 112 could instead include a single side panel section (e.g. the backrest 106 would include only one of side panel section **122*a* or 123*a***).

In the illustrated embodiment, the side panel sections **122*a*-122*d* and 123*a*-123*d* are movably connected to the frame 102 via one or more elongated slide members 200 which are slidably received in a corresponding elongated sleeve 202 disposed transversely to the bed 100 and secured to the frame 102. In one embodiment, the slide members 200 could further be provided with rollers (not shown) to facilitate their movement within the sleeve 202**.

In the illustrated embodiment, the bed 100 further includes a transmission assembly 250 for moving multiple side panel sections when a single side panel section is moved. Specifically, the transmission assembly 250 is generally similar to the transmission assembly illustrated and disclosed in International PCT Publication No. WO2017/051386, the specification of which is incorporated herein by reference.

In this embodiment, the transmission assembly 250 includes a plurality of flexible transmission members or cables 252 which interconnect the side panel sections **122*a*-122*d* and 123*a*-123*d*. Specifically, each cable 252 has a first end secured to one of the slide members 200 and a second end also secured to the same slide member 200. The cable 252 is configured such that it extends from the first end laterally towards one of the left and right sides of the bed 100 and from the second end laterally towards the other one of the left and right sides of the bed 100. Each cable 252 thereby forms a loop and pulling or exerting tension along the cable 252 in a first direction causes the side panel section (e.g. side panel section 122***a*) to move towards the central panel section 120*a*, while pulling or exerting tension along the cable 252 in a second direction opposite the first direction causes the side panel section (e.g. side panel section 122*a*) to move away from the central panel section 120*a*.

In the illustrated embodiment, to further coordinate the movement of the side panel section 123*b* such that the side panel sections 122*a*-122*d* and 123*a*-123*d* all move simultaneously towards or away from their respective central section 120*a*-120*d*, all of the cables 252 are further secured near a center of the cable 252 to a cable carriage 254 which is movable laterally relative to the frame 102. In this configuration, movement of one of the side panel sections 122*a*-122*d* and 123*a*-123*d* in one direction causes movement of the cable 252 in the first direction, which in turn moves the carriage 254 laterally in a first lateral direction. Since all cables 252 are secured to the carriage 254, all cables 252 are thereby moved simultaneously towards the same first direction, thereby moving all other side panel sections 122 in the same lateral direction (i.e. towards or away from the central panel section 120) as the first one of the side panel sections 122.

Alternatively, instead of cables 252 forming loops, the cables 252 could instead include two cables segments, each secured to opposite lateral ends of the carriage 254.

A complete detailed description of the cables 252 and their configuration is provided in International PCT Publication No. WO2017/051386.

Figure 2A:
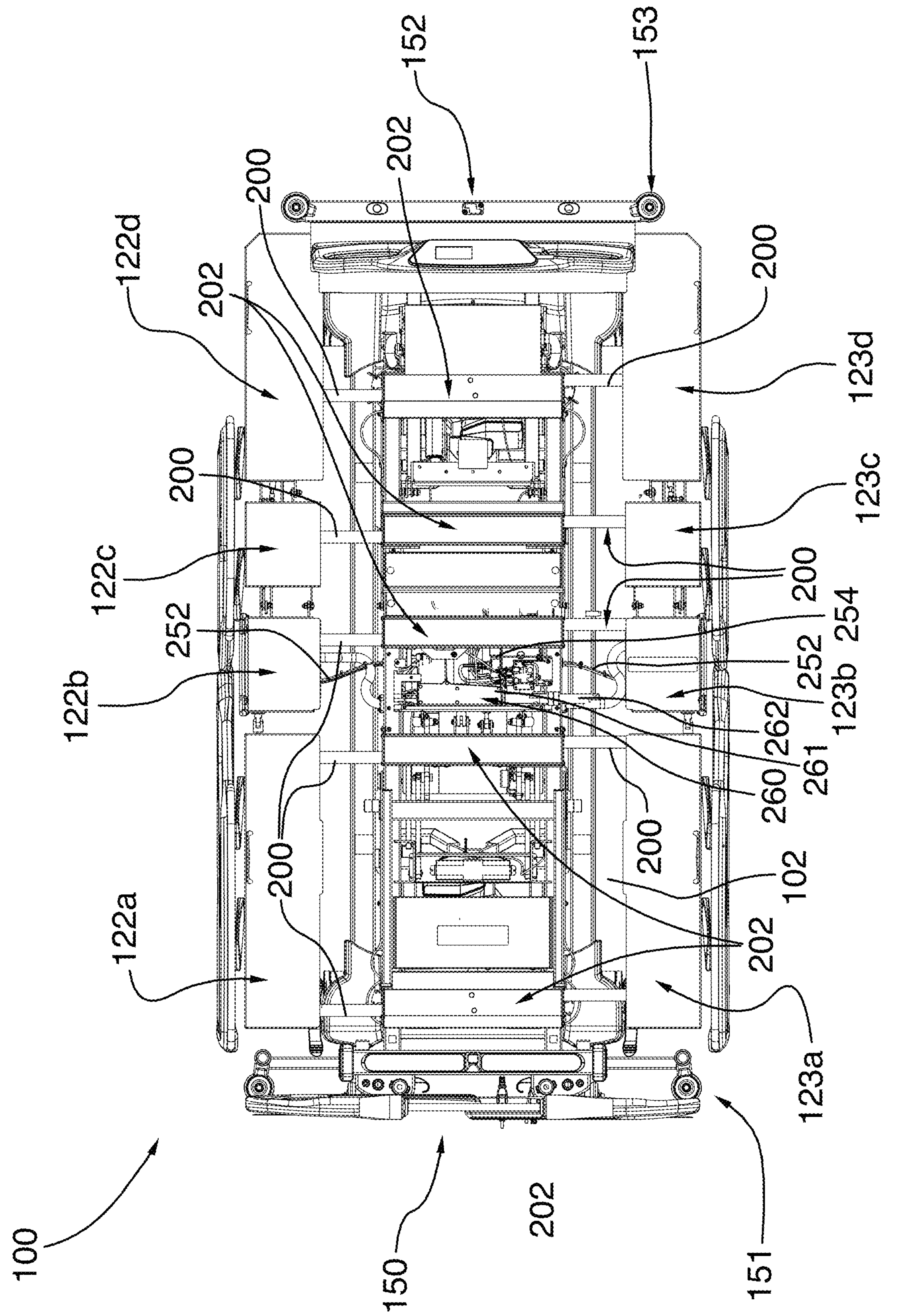
FIG. 2A is another top view of the hospital bed with adjustable width illustrated in FIG. 1A, still showing the bed in an extended position but with the central panel sections removed to show control cables connecting the side panel sections and with arrows showing tension in the control cables.
Figure 2B:
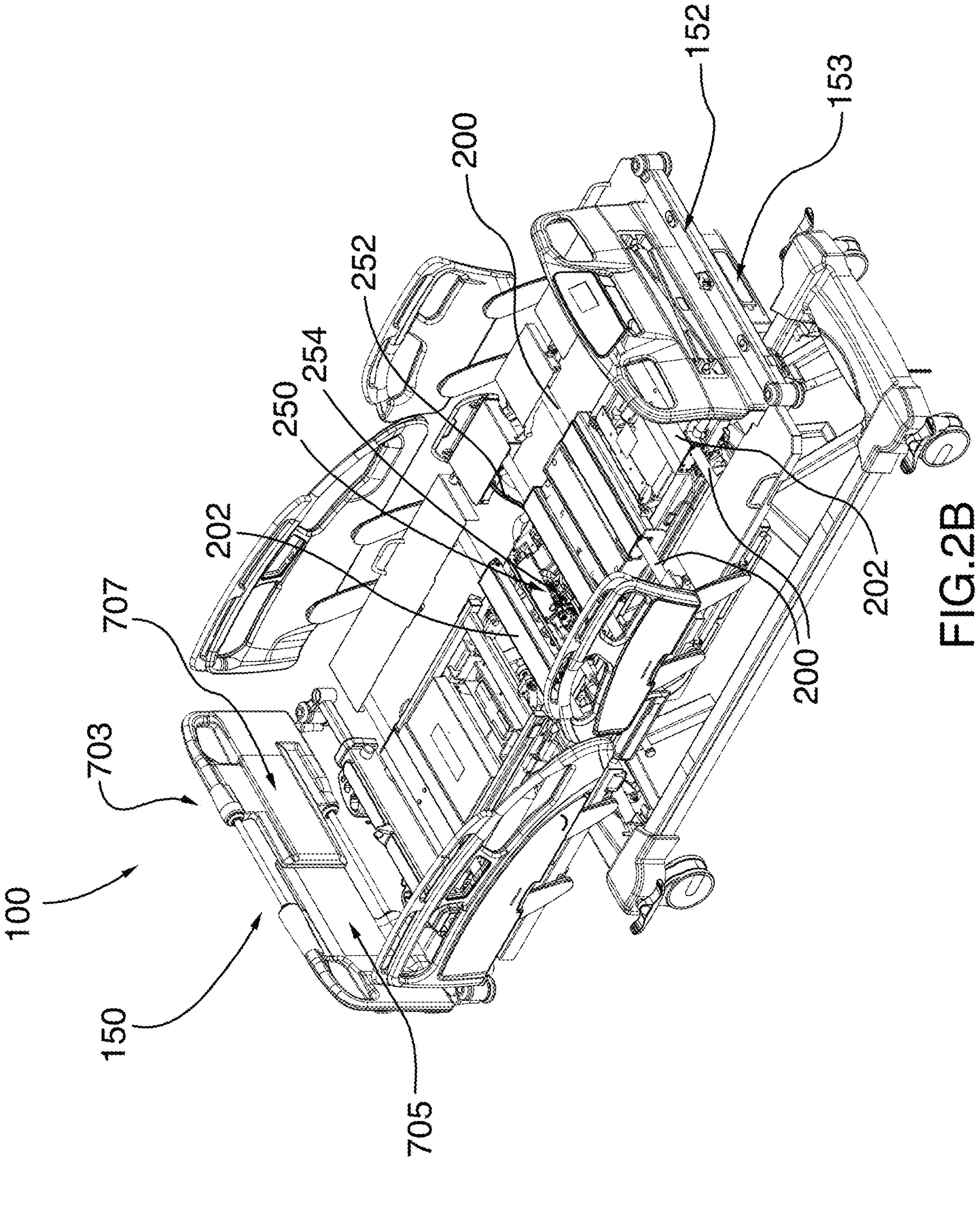
FIG. 2B is a top, right perspective view of the hospital bed shown in FIG. 2A.

In one embodiment, the bed 100 further includes a width adjustment actuator 260 having a housing 261 secured to the frame 102 and a threaded rod 262 extending laterally from the housing and connected to one of the side panel sections 123*b* of the first core support panel 110 (shown in FIG. 2A). Specifically, the housing 261 could include a motor (not shown) and the threaded rod 262 could be coupled to the motor such that rotation of the motor causes rotation of the threaded rod 262. The threaded rod 262 could further be threadably coupled to the housing 261 such that rotation of the threaded rod 262 in turn causes extension or retraction of the threaded rod 262, and therefore lateral movement of the side panel section 123*b* of the first core support panel 110.

In the illustrated embodiment, the threaded rod 262 is further coupled to an extension shaft 264 (shown in FIGS. 3 to 6) which defines an extension to the threaded rod 262 and which rotatably engages the side panel section 123*b* of the first core support panel 110. Alternatively, the threaded rod 262 may directly engage the side panel section 123*b*.

Figure 3:
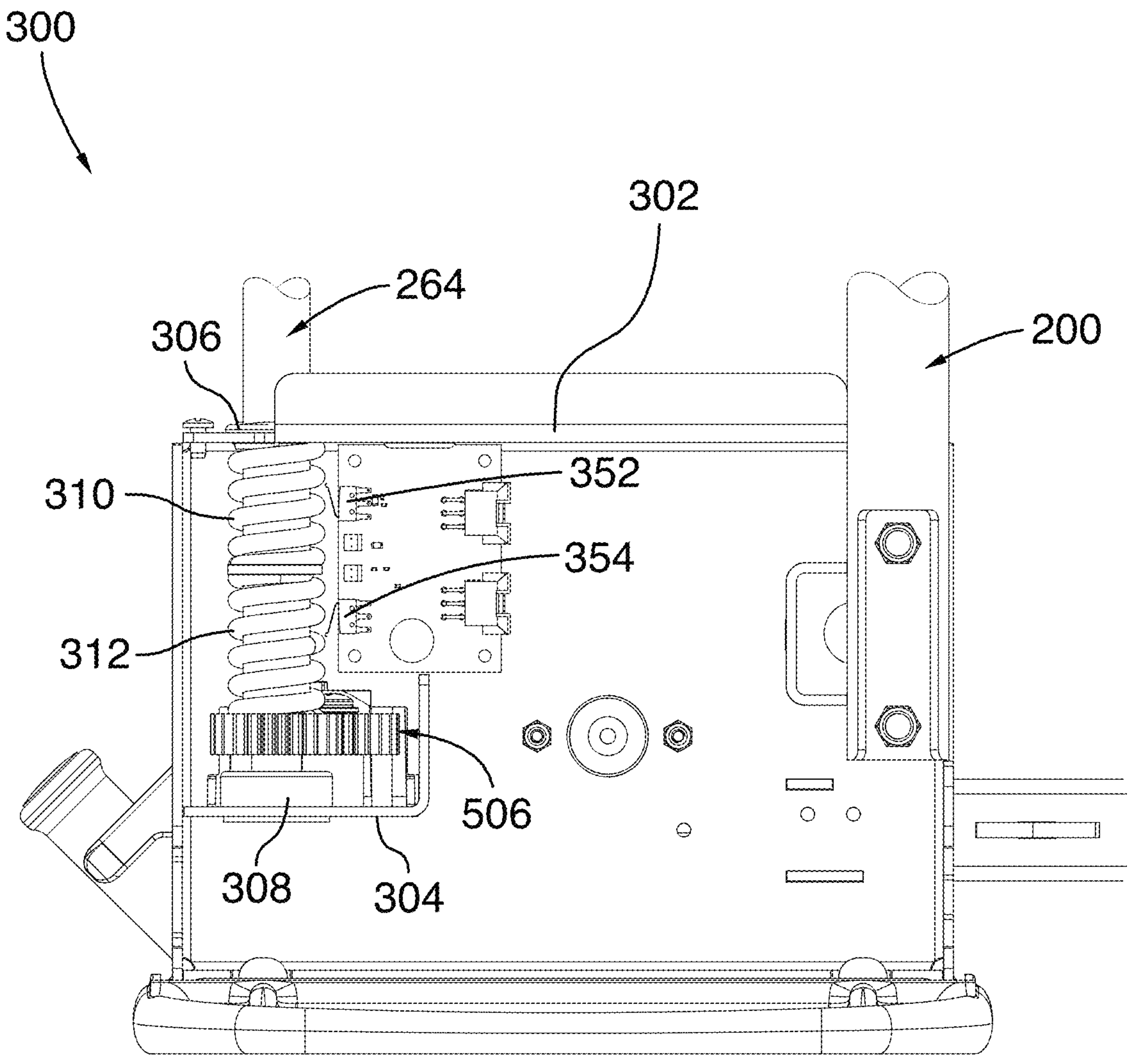
FIG. 3 is an enlarged top view of the hospital bed with adjustable width illustrated in FIG. 1, showing details of a base casing including first and second coil springs in a normal, uncompressed position.
Figure 4:
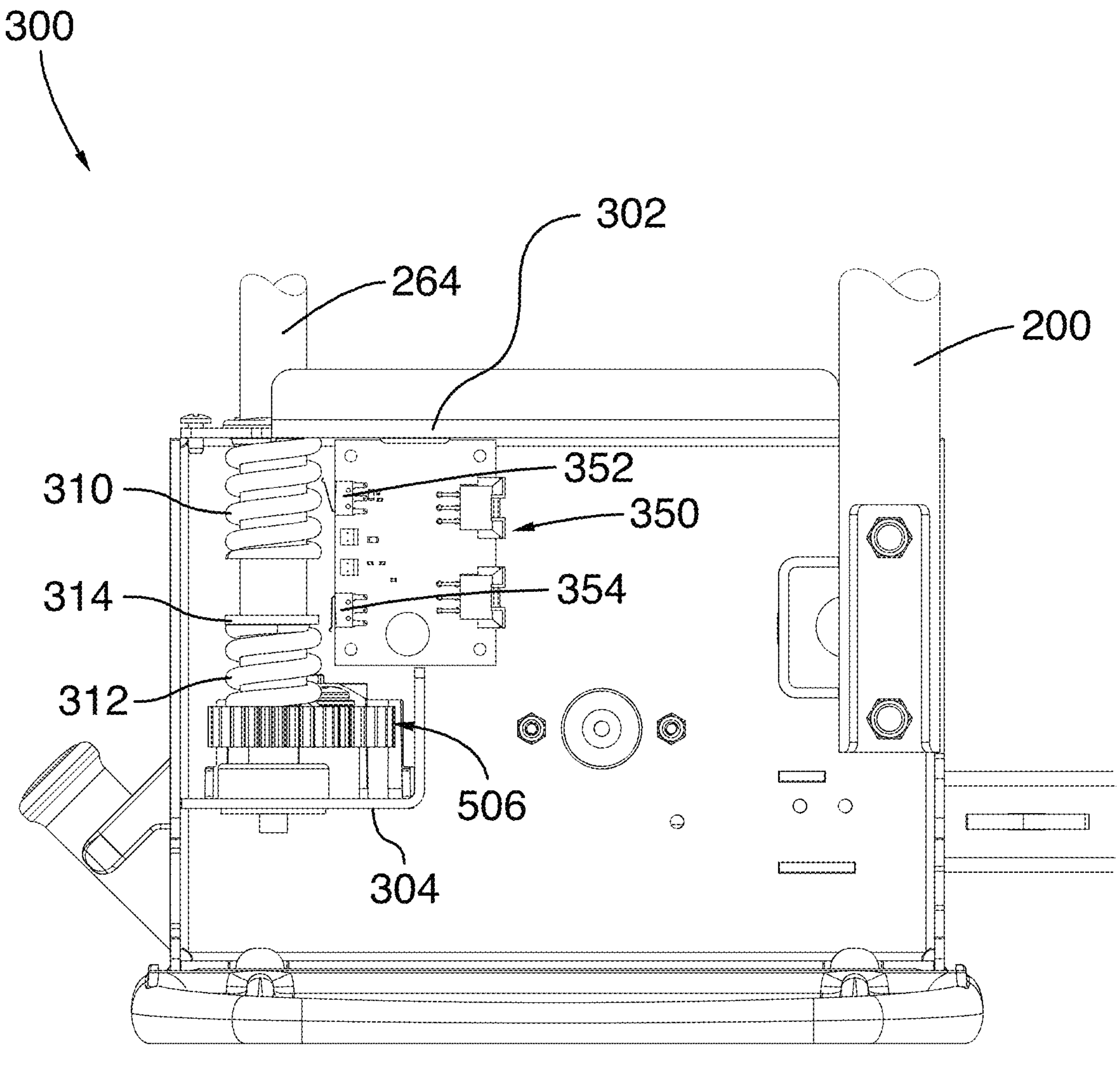
FIG. 4 is another enlarged top view of the base casing for the hospital bed with adjustable width illustrated in FIG. 3, with the second coil spring in a compressed position.

Now referring to FIGS. 3 and 4, the side panel section 123*b* of the first core support panel 110 includes a base casing 300 which has a first wall 302 which extend generally vertically and orthogonally to the extension shaft 264 and a second wall 304 which is generally parallel to the first wall 302 and which is spaced away from the first wall 302, away from the central panel section 120. The extension shaft 264 extends to the first wall 302 and is rotatably mounted to the first wall 302 by a first roller or ball bearing 306 and to the second wall 304 by a second roller or ball bearing 308.

In the illustrated embodiment, the base casing 300 is further connected to a slide member 200 which engages a sleeve 202 secured to the frame 102, as described above.

Figure 5:
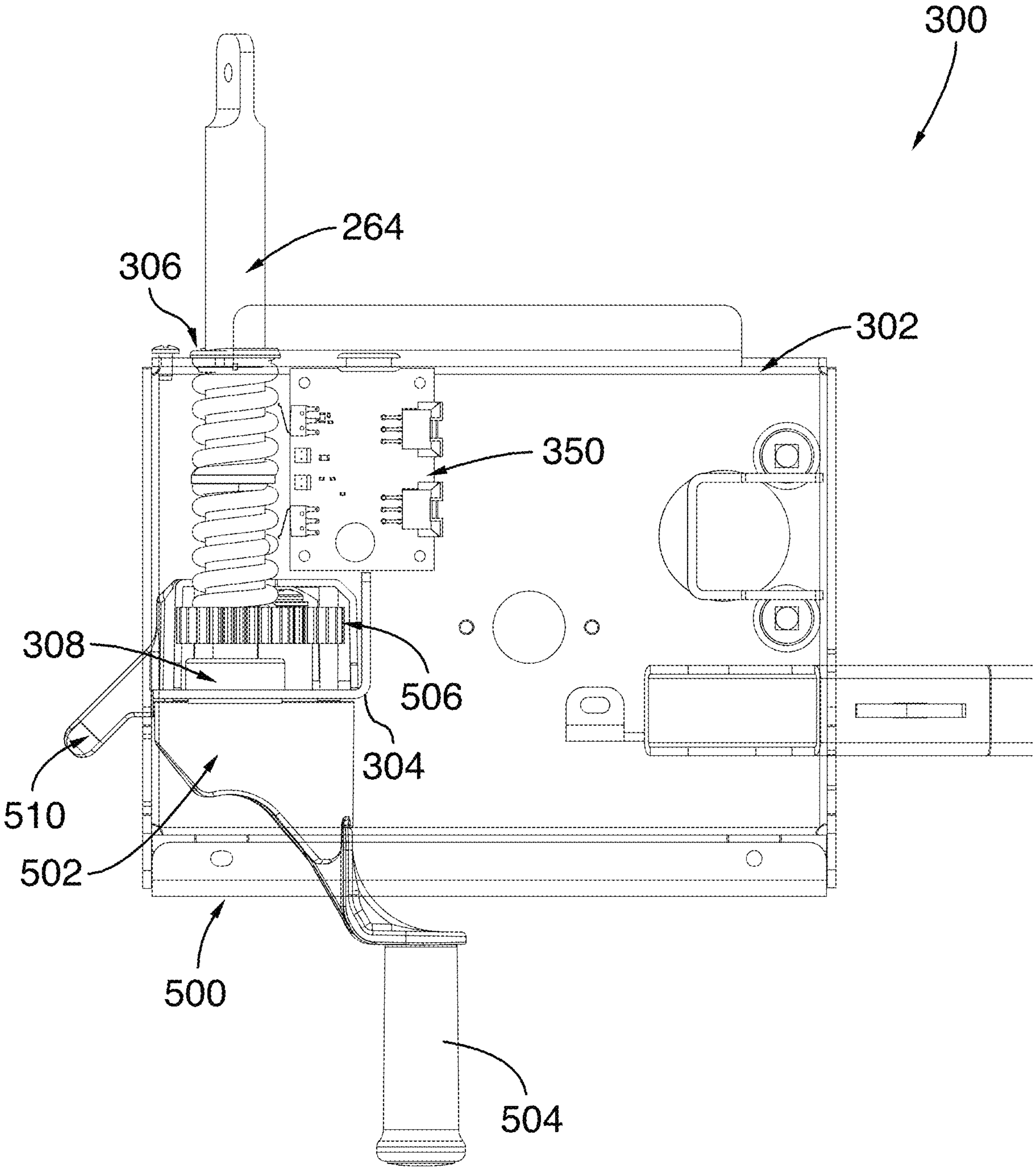
FIG. 5 is another enlarged top view of the hospital bed with adjustable width illustrated in FIG. 1, showing a manual handle operatively connected to the extension shaft.
Figure 6:
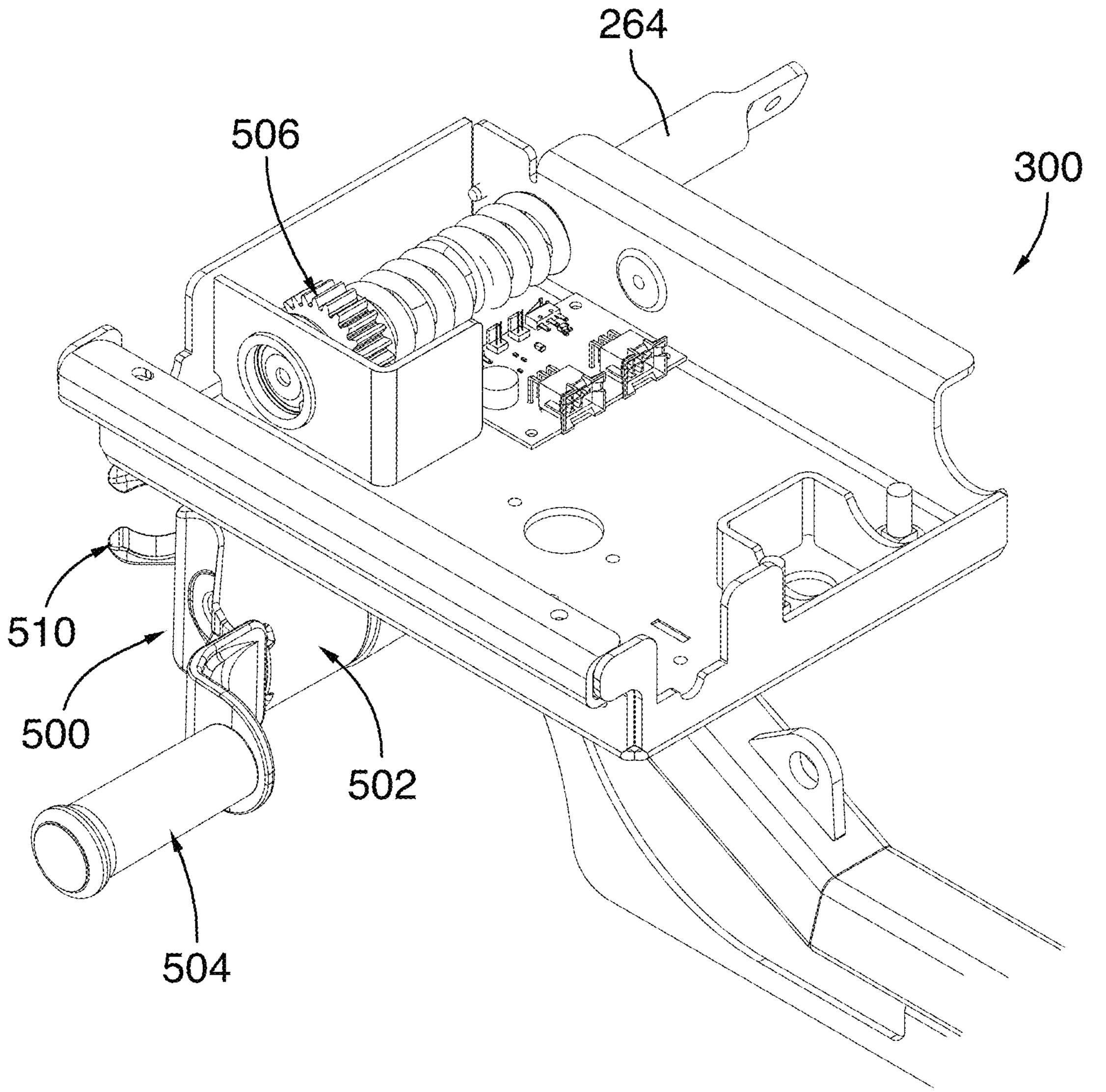
FIG. 6 is a top perspective view of the hospital bed with adjustable width with the manual handle operatively connected to the extension shaft, as illustrated in FIG. 5.
Figure 7:
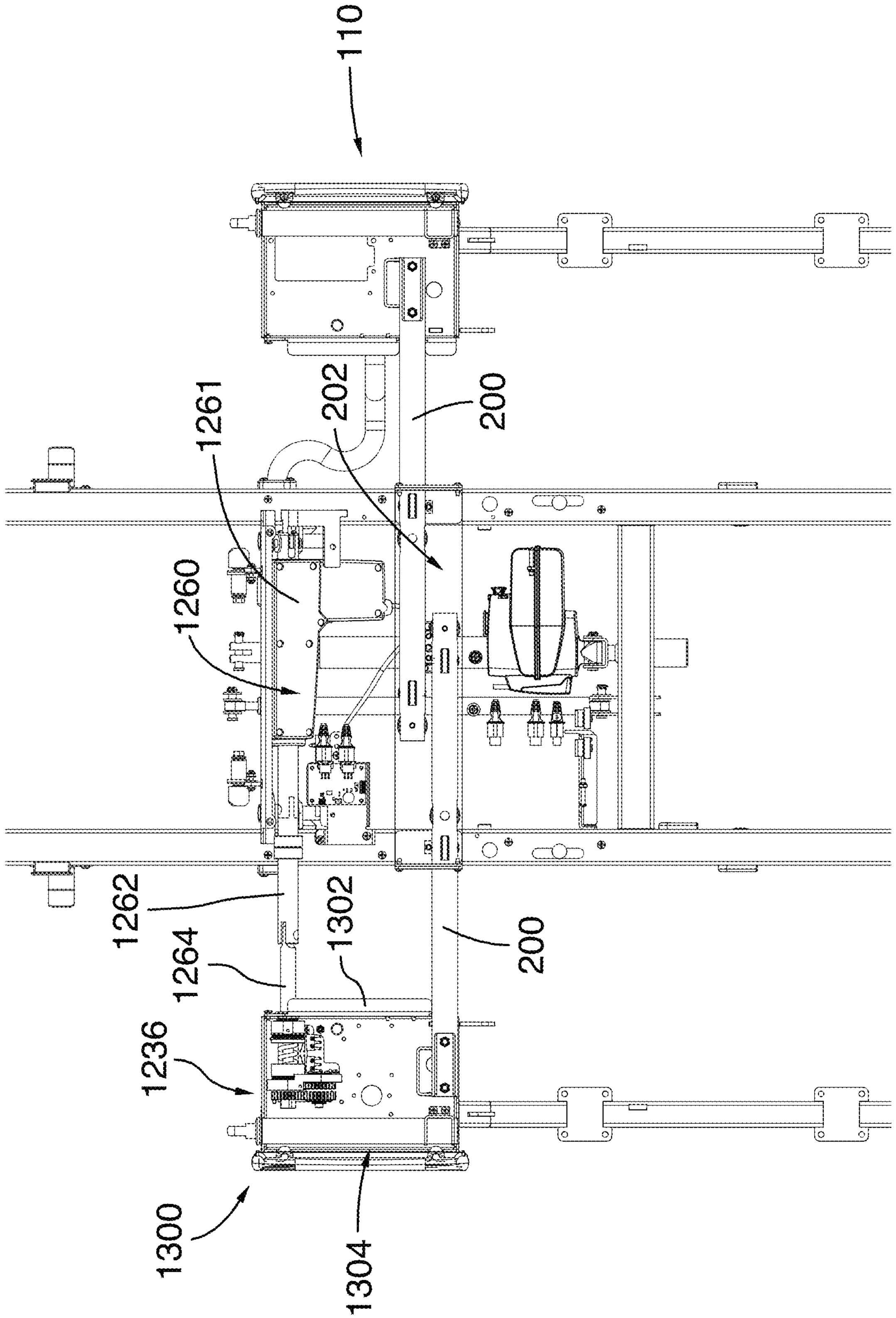
FIG. 7 is a top, partial view of a hospital bed with adjustable width, in accordance with another embodiment, showing the bed in an extended position.

Turning to FIGS. 5 and 6, the threaded rod 262 can further be uncoupled from the housing 261 such that the threaded rod 262 can be rotated without actuation of the motor.

In the illustrated embodiment, the threaded rod 262 can be rotated manually using a handle 500 which includes a rotatable base 502 and a crank 504 extending away from the base 502. Specifically, the rotatable base 502 is adapted to rotate about a rotation axis which is generally parallel to the rotation axis of the extension shaft 264 and of the threaded rod 262 of the actuator 260. The handle 500 further includes a plurality of gears 506 which are arranged to transmit rotation of the rotatable base 502 to the extension shaft 264 and to the threaded rod 262. Still in the illustrated embodiment, the crank 504 is generally off-centered relative to the rotatable base 502 to allow the rotatable base 502 to be rotated using the crank 504.

Still in the illustrated embodiment, the crank 504 is also hingeably connected to the rotatable base 502 such that the crank 504 can be stored away into a storage bracket 510 when not in use. When not in use, the handle 500 could also be uncoupled from the extension shaft 264.

Now turning back to FIGS. 3 and 4, the base casing 300 further includes a first resilient member or coil spring 310 and a second resilient member or coil spring 312 which are mounted coaxially on the extension shaft 264.

Specifically, the extension shaft 264 includes an abutment ring 314 which is secured on the extension shaft 264 and which is disposed between the first and second walls 302, 304 of the base casing 300 when the extension shaft 264 is mounted to the base casing. The abutment ring 314 has an outer diameter which is larger than the outer diameter of the extension shaft 264. The first coil spring 310 is sandwiched between the first wall 302 and the abutment ring 314 and the second coil spring 312 is sandwiched between the abutment ring 314 and the second wall 304. Specifically, the second coil spring 312 is sandwiched between the abutment ring 314 and the gear 506 adjacent the second wall 304. In this embodiment, the extension shaft 264 is adapted to rotate relative to the first and second walls 302, 304 via the first and second rollers 306, 308, but is not secured to the rollers 306, 308 and is therefore also allowed to move longitudinally relative to the first and second walls 302, 304.

In the illustrated embodiment, the first and second coil springs 310, 312 are relatively stiff such that movement of the side panel section 123*b* normally follows the movement of the extension shaft 264 as if the extension shaft 264 was longitudinally secured to the base casing 300.

In some circumstances, an external force may be exerted on one or more of the side panel sections (e.g. side panel section 122*a*). For example, one or more of the side panel sections 122*a*-122*d* or 123*a*-123*b* may be abutting a wall of a room as the actuator 260 is extending, thereby resisting movement of the side panel sections 122*a*-122*d* and 123*a*-123*d* laterally away from the central panel sections 120*a*-120*d*. One or more of the side panel sections 122*a*-122*d* and 123*a*-123*d* may also be bumped against a wall as the bed 100 is moved, when the actuator 260 is stationary or as the actuator 260 is extending, thereby forcing the side panel sections 122*a*-122*d* and 123*a*-123*d* laterally towards the central panel sections 120*a*-120*d*. Extra weight, from a patient lying on the bed 100 for instance, may also be put vertically on one or more of the side panel sections 122*a*-122*d* and 123*a*-123*d*, thereby creating friction and resisting movement of the side panel sections 123*a*-123*d* laterally towards or away from the central panel sections 120*a*-120*d*.

These circumstances may cause strain on the transmission assembly 250. If the extension shaft 264 and/or the threaded rod 262 of the actuator 260 were longitudinally secured to the base casing 300, any force applied on the side panel sections 122*a*-122*d* and 123*a*-123*d* would create undesirable tension in at least some of the cables 252. Specifically, it will be appreciated that with the cable configuration described above and in International PCT Application No. WO2017/051386, at least some of the cables 252 are always in tension. Therefore, any additional tension exerted on the cables 252 may damage or even break the cables 252.

In the illustrated embodiment, when an external force is exerted on the side panel section 123*b* of the first core support panel 110 or on another one of the side panel sections 122*a*-122*d* and 123*a*, 123*c* or 123*d*, the base casing 300 is allowed to move slightly by compressing the first coil spring 310 or the second coil spring 312. In the example illustrated in FIG. 4, the side panel section 123*b* is moved towards the central panel section 120*b*, but the extension shaft 264 and the threaded rod 262 remain immobile because the actuator 260 is not activated, which causes compression of the second coil spring 312. If a weight was placed on the side panel section 123*b* of the first core support panel 110 as the actuator 260 is retracted, then friction may create resistance to the movement of the side panel section 123*b* towards the central panel section 120*b*, which would cause compression of the first coil spring 310.

It will also be understood that since all the side panel sections 122*a*-122*d* and 123*a*-123*d* are connected by the cables 252 via the central carriage 254, movement of any side panel section 122*a*-122*d* and 123*a*-123*d* relative to the extension shaft 264 or to the threaded rod 262 of the actuator 260 would cause compression of the first coil spring 310 or of the second coil spring 312.

This configuration therefore prevents additional tension from being created on the cables 252. In most situations, the external force may be exerted on the side panel sections 122*a*-122*d* and 123*a*-123*d* for a relatively short time. After this short time, the first or second coil spring 310, 312 would become uncompressed and retake its initial, uncompressed shape shown in FIG. 3. For example, if the side panel section 123*b* is bumped against a wall, the second coil spring 312 would compress to absorb the impact and almost immediately retake its initial, uncompressed shape.

Still referring to FIGS. 3 and 4, the base casing 300 further includes a stop circuit 350 operatively connected to the actuator 260 for stopping the actuator 260 if the first coil spring 310 or the second coil spring 312 is compressed by a certain amount. In the illustrated embodiment, the stop circuit 350 is disposed adjacent the extension shaft 264 and includes a first limit switch 352 disposed generally between the abutment ring 314 and the first wall 302 and a second limit switch 354 disposed generally between the abutment ring 314 and the second wall 304 of the base casing 300.

When the first coil spring 310 is compressed, the abutment ring 314 moves towards the first wall 302 and when the second coil spring 312 is compressed, as shown in FIG. 4, the abutment ring 314 moves towards the second wall 304.

As described above, the first or second coil springs 310, 312 may remain compressed for a relatively short time and may be compressed by a relatively small amount or length. In other cases, the first or second coil springs 310, 312 may be compressed by a relatively large amount or length, in which case it may be desirable to deactivate the actuator 260 to avoid damaging the cables 252 and/or the actuator 260 itself.

For example, the actuator 260 may be extending to move the side panel sections 122*a*-122*d* and 123*a*-123*d* laterally away from the central panel sections 120*a*-120*d*, but one or more of the side panel sections 122*a*-122*d* and 123*a*-123*d* may abut a wall and be prevented from moving laterally away from the central panel sections 120*a*-120*d*. In this case, the abutment ring 314 would move towards the second wall 304 of the base casing 300, thereby compressing the second coil spring 312, and would keep moving towards the second wall until it triggers the second limit switch 354, thereby deactivating the actuator 260.

As it will be appreciated, the base casing 300 provided with the stop circuit 350 operates to restrict or limit the force applied by the operation of the actuator 260 in case one or more side panel sections 122*a*-122*d* or 123*a*-123*d* are prevented or restricted from moving laterally toward or away from the central panel sections 120*a*-120*d*. The base casing 300 further acts as a safety mechanism for protecting components of the bed 100, such as the actuator 260, the slide members 200, the sleeves 202, the cables 252 as well as the side panel sections 122*a*-122*d* or 123*a*-123*d*. More specifically, when the movement of one or more side panel sections 122*a*-122*d* or 123*a*-123*d* is restricted in either inward or outward direction, the limit switches 352 or 354 will be activated by the compression of the first and second coil springs 310,312, thus preventing the components of the bed 100 to be damaged or destructed by the activation of the actuator 260.

Alternatively, the base casing 300 may not include a stop circuit 350.

In another embodiment, instead of two coil springs, the base casing could include a single coil spring. The single coil spring could be adapted to be alternatively compressed and extended. An example of such an embodiment is illustrated in FIGS. 7 to 13. In this embodiment, and referring more specifically to FIG. 7, a base casing 1300 is mounted to the side panel section 123*b* of the first core support panel 110, the base casing 1300 including a first wall 1302 which extend generally vertically and orthogonally to the extension shaft 1264 and a second wall 1304 which is generally parallel to the first wall 1302 and which is spaced away from the first wall 1302, away from the central panel section 120.

Figure 8:
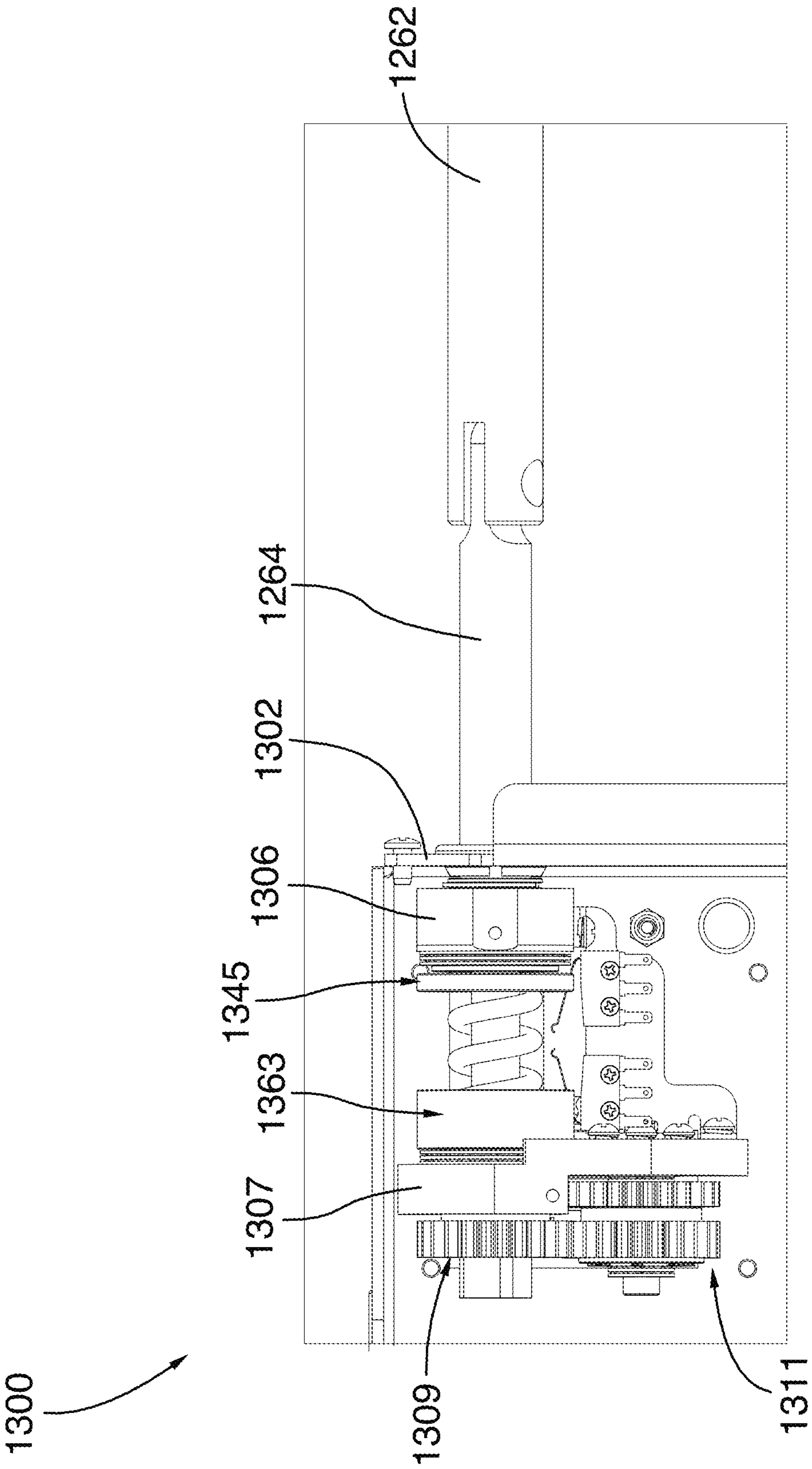
FIG. 8 is an enlarged top partial view of the hospital bed with adjustable width illustrated in FIG. 7, showing details of a base casing including a coil spring in a normal, uncompressed position.
Figure 9A:
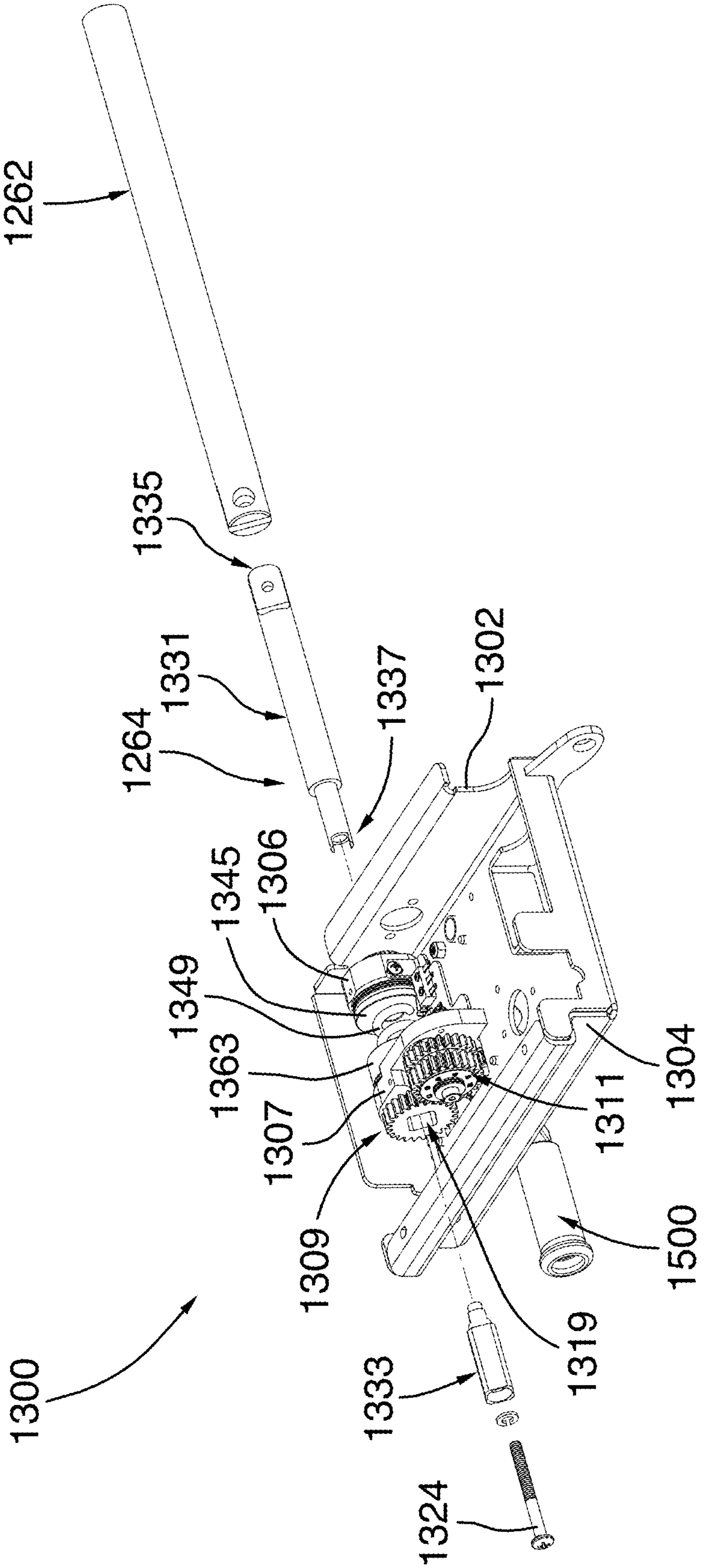
FIG. 9A is a left perspective, partially exploded view of the base casing illustrated in FIG. 8.
Figure 9B:
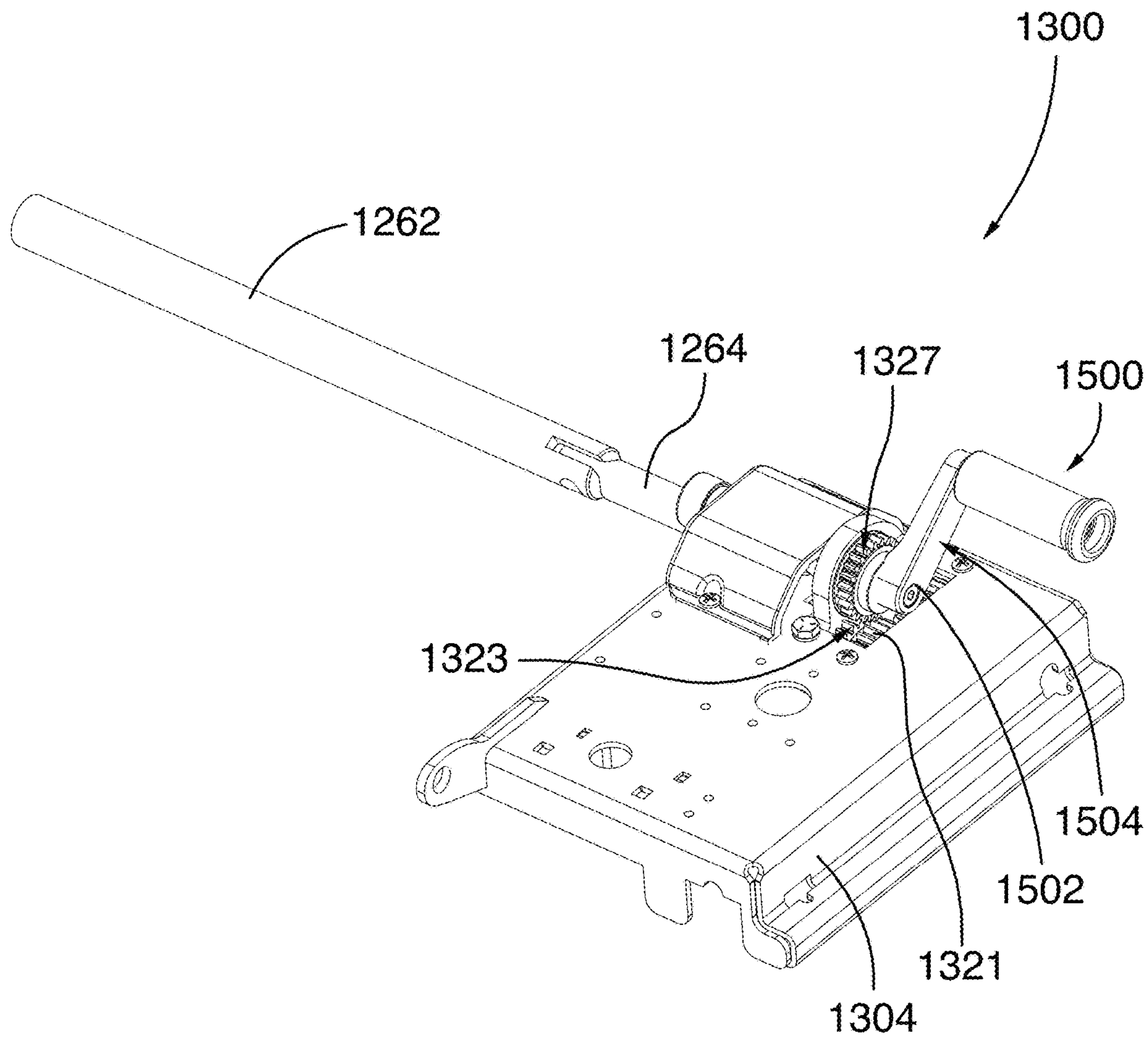
FIG. 9B is a bottom perspective view of the base casing illustrated in FIG. 8.
Figure 10:
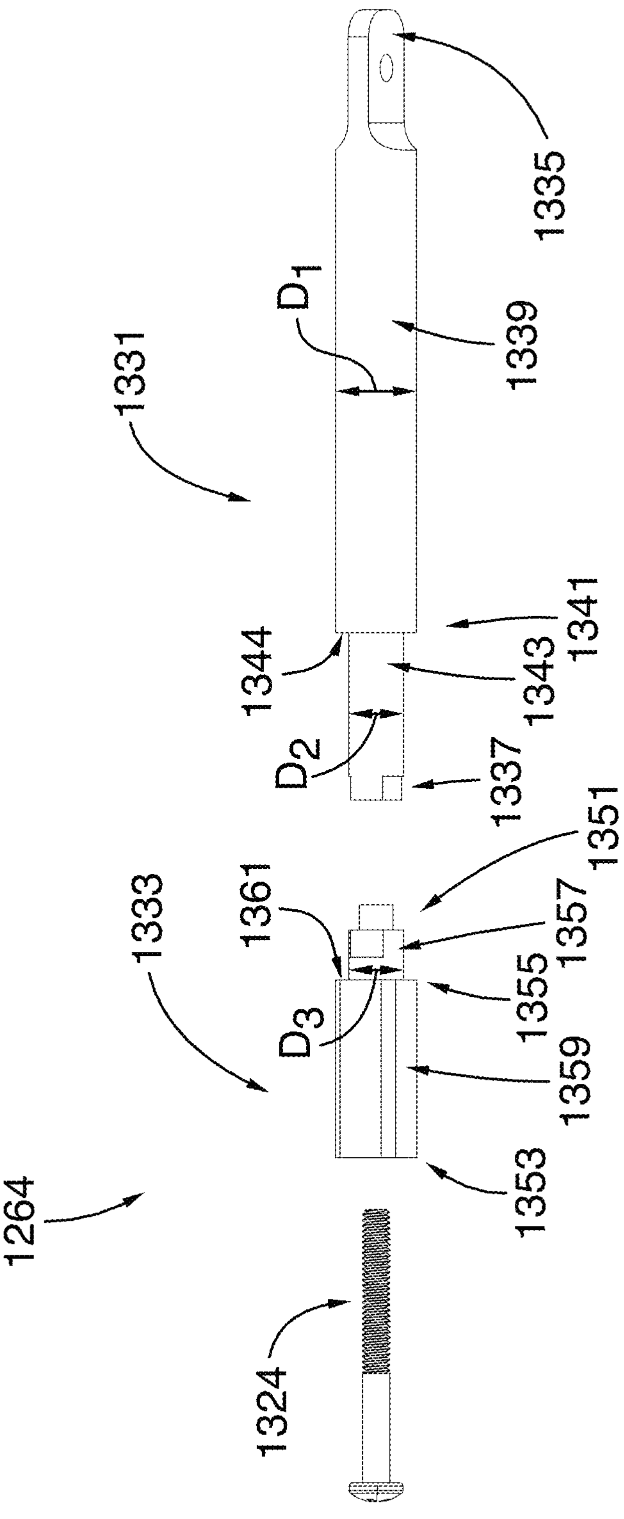
FIG. 10 is a front exploded view of an extension shaft illustrated in FIG. 8.
Figure 11:
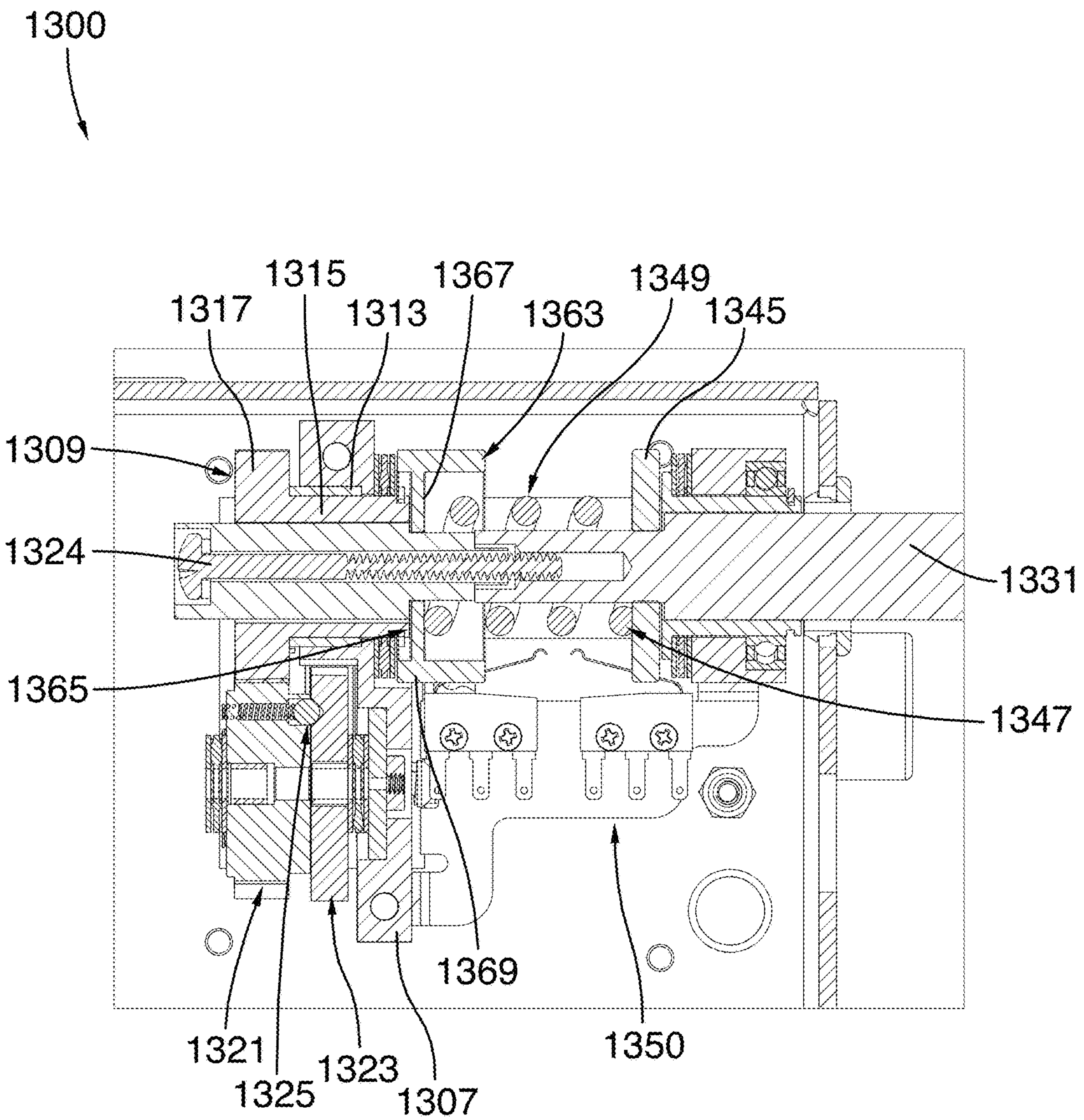
FIG. 11 is a cross-section view of the of the hospital bed with adjustable width illustrated in FIG. 7, showing details of a base casing including a coil spring in a normal, uncompressed position.

With reference to FIGS. 8, 9A and 9B, the extension shaft 1264 extends through the first wall 1302 and is rotatably mounted to the housing 1300 by a first roller or ball bearing 1306 located proximal to the first wall 1302. The extension shaft 1264 also extends through a bracket 1307 fixedly secured to the housing 1300, proximal to the second wall 1304. The bracket 1307 is configured for rotatably supporting a plurality of gears for operatively connecting a handle 1500 to the extension shaft 1264. More specifically, the bracket 1307 comprises a first circular hole (not shown) in alignment with the rotation axis of the extension shaft 1264. Mounted in the circular hole (not shown), via a roller or ball bearing 1313 (shown in FIG. 11), is a shaft gear 1309. As seen from the top (e.g. top cross-section view of FIG. 11), the shaft gear 1309 is generally T-shaped and has a smaller portion 1315 received in the hole (not shown) and a wider portion 1317 located between the bracket 1307 and the second wall 1304. Extending from one side to the other of the shaft gear 1309 is a square hole 1319. As it will be described in greater details below, the square hole 1319 is configured for slidably receiving therein a portion of the shaft 1264, for allowing the shaft 1264 to move sideways along the rotation axis or, in other words, to move longitudinally relative to the first wall 1302 and bracket 1307. The bracket 1307 is also provided with a second hole (not shown) for receiving a transmission gear assembly 1311 comprising a first gear portion 1321 engaging the shaft gear 1309, as well as a second gear portion 1323. In this embodiment, the second gear portion 1323 is coupled to the first gear 1321 portion via a clutch mechanism 1325 (shown in FIG. 11). The bracket 1307 also comprises a third hole (not shown) for receiving a handle gear 1327, the handle gear 1327 being operatively couple to a handle 1500 for manually for moving the side panel 122 between the expanded position and the retracted position relative to the first core support panel 110, as it will become apparent below. The clutch mechanism 1325 allow the operation of the system while preventing damage that may occur due to a user exerting inappropriate force on the system.

In the illustrated embodiment, and referring more specifically to FIGS. 9A, 9B, 10 and 11, the extension shaft 1264 comprises a first portion 1331 and a second portion 1333. The first portion 1331 has an internal end 1335 connected to the threaded rod 1262 and an external end 1337 engaging first roller or ball bearing 1306 of the housing 1300. Defined between the internal and external ends 1335, 1337, respectively is a wider portion 1339 having a generally circular cross-section having a first diameter $D_1$, and extending between the internal end 1335 and an intermediate location 1341, as well as a narrower portion 1343, having a generally circular cross section and a second diameter $D_2$. The narrower portion 1343 extends from the intermediate location 1341 to the external end 1337 of the first portion 1331. As it can be appreciated, the first diameter $D_1$ being larger that the diameter $D_2$, a lip 1344 is defined at the intermediate location 1341. Mounted to narrower portion 1343, and slidable between the external end 1337 and the lip 1344, is a ring 1345. As it will become apparent below, the ring 1345 is sized and shaped for providing a surface against which rests one end 1347 of a coil spring 1349. Furthermore, the diameter $D_1$ of the first portion 1331 is sized such that the first portion 1331 is slidable relative to the first roller or ball bearing 1306, as it will become apparent below.

The second portion 1333 of the extension shaft 264 has an internal end 1351 connected to and engaging the external end 1337 of the first portion 1331, and an external end 1353 engaging the shaft gear 1309. Extending between the internal end 1351 and an intermediate location 1355 is a first segment 1357 having a generally circular cross-section having a third diameter $D_3$. In the illustrated embodiment, the diameter $D_3$ of the second portion 1333 corresponds to the diameter $D_2$ of the first portion 1331. Extending from the intermediate location 1355 to the external end 1353 of the second portion 1333 is a second segment 1359. The second segment 1359 has a generally square cross-section, and is sized larger than the diameter $D_3$ of the first segment 1357. As such, a lip 1361 is defined and the intermediate location 1355. The first and second portions 1331 and 1333 are assembled together using a threaded fastener 1324. While in this embodiment, the first and second portions 1331 and 1333 are two separate components assembled together, it will be appreciated that the extension shaft 1264 could be manufactured as a single piece.

A flanged ring 1363 is slidably mounted to the first segment 1357 of the second portion 1333. The flanged ring 1363 is sized and shaped for receiving a second end 1365 of the coil spring 1349. More specifically, the flanged ring 1363 comprises an annular base 1367 from which extend a cylindrical wall 1369. The internal diameter of the cylindrical wall 1369 is slightly larger than the external diameter of the coil spring 1349. As such, the second end 1365 of the coil spring 1349 is received in an annular cavity defined between the cylindrical wall 1369 and the first segment 1357 of the second portion 1333.

The coil spring 1349 is concentrically mounted to the extension shaft 1264 and extends between the first ring 1345 and the flanged ring 1363. In other words, the coil spring 1349 is sandwiched between the first ring 1345 and the flanged ring 1363. The coil spring 1349 is biased such that it forces the first ring 1345 against the first lip 1344 of the first portion 1331 and the flanged ring 1363 against the second lip 1361 of the second portion 1333. The coil spring 1349 is pre-constrained such that it will exert a force that is adequate for ensuring the side panel 122 to move in either the internal or external direction while the electric actuator 1260 or the handle 1500 is operated, while providing sufficient dampening in case the movement of the side panel is obstructed in either direction. In other words, the coil spring 1349 is relatively stiff such that movement of the side panel section 123*b* normally follows the movement of the extension shaft 264 as if the extension shaft 264 was longitudinally secured to the base casing 1300.

In the illustrated embodiment, the base casing 1300 is further connected to a slide member 200 which engages a sleeve 202 secured to the frame 102, as described above.

In the illustrated embodiment, the threaded rod 1262 can be driven by a motor (not shown) housed in a housing 1261 of the actuator 1260, or can be rotated manually, via extension shaft 1264, using a handle 1500. Handle 1500 includes a rotatable base 1502 and a crank 1504 extending away from the base 1502. Specifically, the rotatable base 1502 is adapted to rotate about a rotation axis which is generally parallel to the rotation axis of the extension shaft 1264 and of the threaded rod 1262 of the actuator 1260. The handle 1500 is further coupled to the handle gear 1327, which is itself coupled second gear portion 1323 of the gear assembly 1311. By way of the clutch 1325, the rotation of the second gear portion 1323 drives rotation of the first gear portion 1321 engaging the shaft gear 1309, to thereby transmit rotation of the rotatable base 1502 to the extension shaft 1264 and to the threaded rod 1262. Still in the illustrated embodiment, the crank 1504 is generally off-centered relative to the rotatable base 1502 to allow the rotatable base 1502 to be rotated using the crank 1504.

Still in the illustrated embodiment, the crank 1504 is also hingeably connected to the rotatable base 1502 such that the crank 1504 can be stored away into a storage bracket when not in use. When not in use, the handle 1500 could also be uncoupled from the extension shaft 1264.

In some circumstances, an external force may be exerted on one or more of the side panel sections 122*a*-122*d* or 123*a*-123*d* as the actuator 1260 is extending thereby resisting movement of the side panel sections 122*a*-122*d* or 123*a*-123*d* laterally away from the central panel sections 120*a*-120*d* or resisting movement of the side panel sections 122*a*-122*d* or 123*a*-123*d* laterally towards the central panel sections 120*a*-120*d*. Again, these circumstances may cause strain on the transmission assembly 250. If the extension shaft 1264 and/or the threaded rod 1262 of the actuator 1260 were longitudinally secured to the base casing 1300, any force applied on the side panel sections 122*a*-122*d* or 123*a*-123*d* would create undesirable tension in at least some of the cables 252.

In the illustrated embodiment, when an external force is exerted on the side panel section 123*b* of the first core support panel 110 or on another one of the side panel sections 122*a*-122*d*, 123*a*, 123*c* or 123*d*, the base casing 1300 is allowed to move slightly by compressing the coil spring 1349. In the example illustrated in FIG. 12, the side panel section 123*b* is moved towards the central panel section 120, but the extension shaft 1264 and the threaded rod 1262 remain immobile because the actuator 1260 is not activated, which causes compression of the coil spring 1349. If a weight was placed on the side panel section 123*b* of the first core support panel 110 as the actuator 1260 is retracted, then friction may create resistance to the movement of the side panel section 123*b* towards the central panel section 120*b*, which would cause compression of the coil spring 1349.

It will also be understood that since all the side panel sections 122*a*-122*d* or 123*a*-123*d* are connected by the cables via a central carriage (similar to cable 252 and carriage 254), movement of any side panel sections 122*a*-122*d* or 123*a*-123*d* relative to the extension shaft 1264 or to the threaded rod 1262 of the actuator 1260 would cause compression of the coil spring 1349.

This configuration therefore prevents additional tension from being created on the cables 252. In most situations, the external force may be exerted on the side panel sections 122*a*-122*d* or 123*a*-123*d* for a relatively short time. After this short time, the coil spring 1349 would become uncompressed and retake its initial, uncompressed shape shown in FIG. 11. For example, if the side panel section 123*b* is bumped against a wall, the coil spring 1349 would compress to absorb the impact and almost immediately retake its initial, uncompressed shape.

Figure 12:
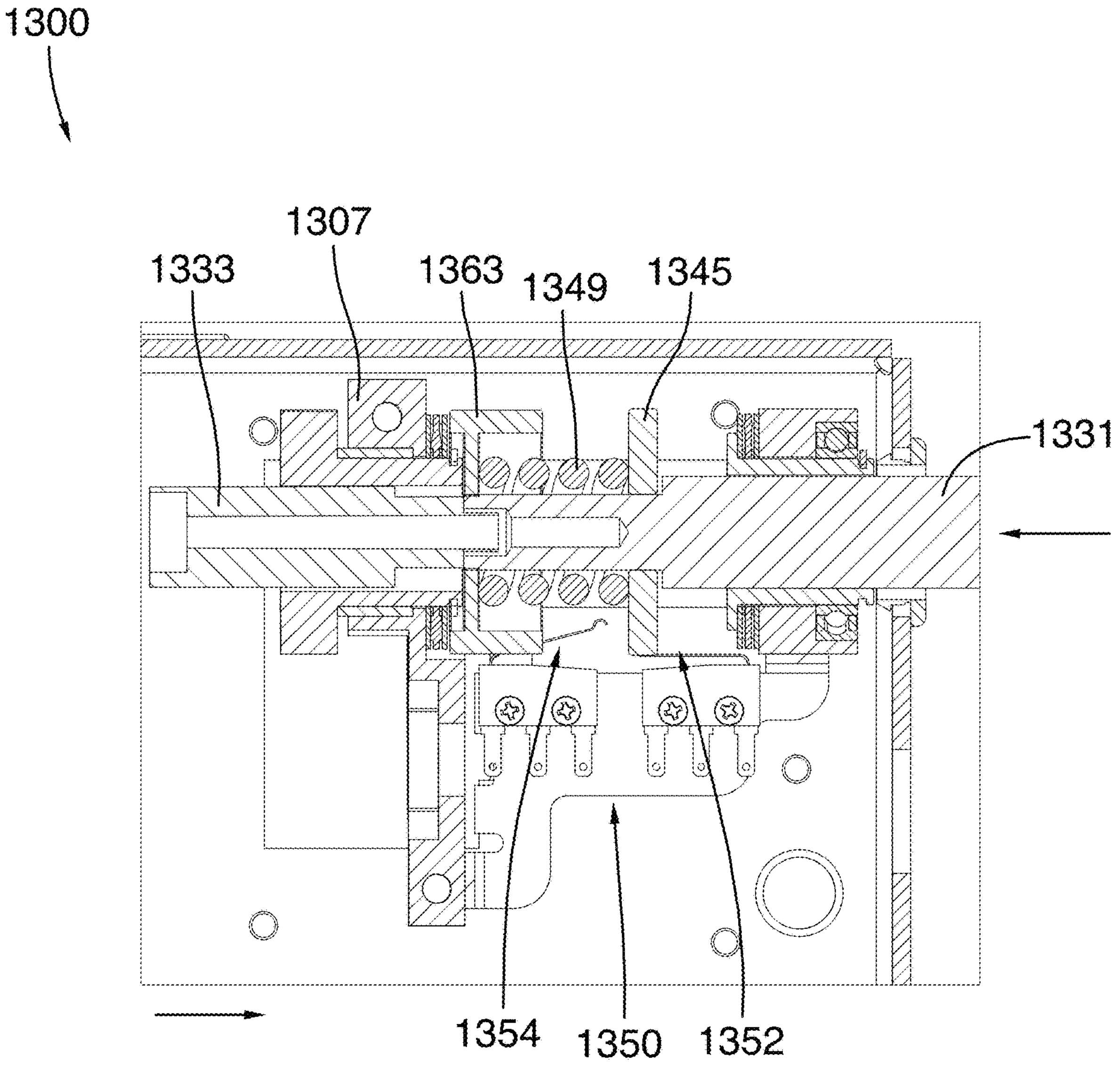
FIG. 12 is a cross-section view of the of the hospital bed with adjustable width illustrated in FIG. 7, showing details of a base casing including a coil spring in a outwardly compressed position.
Figure 13:
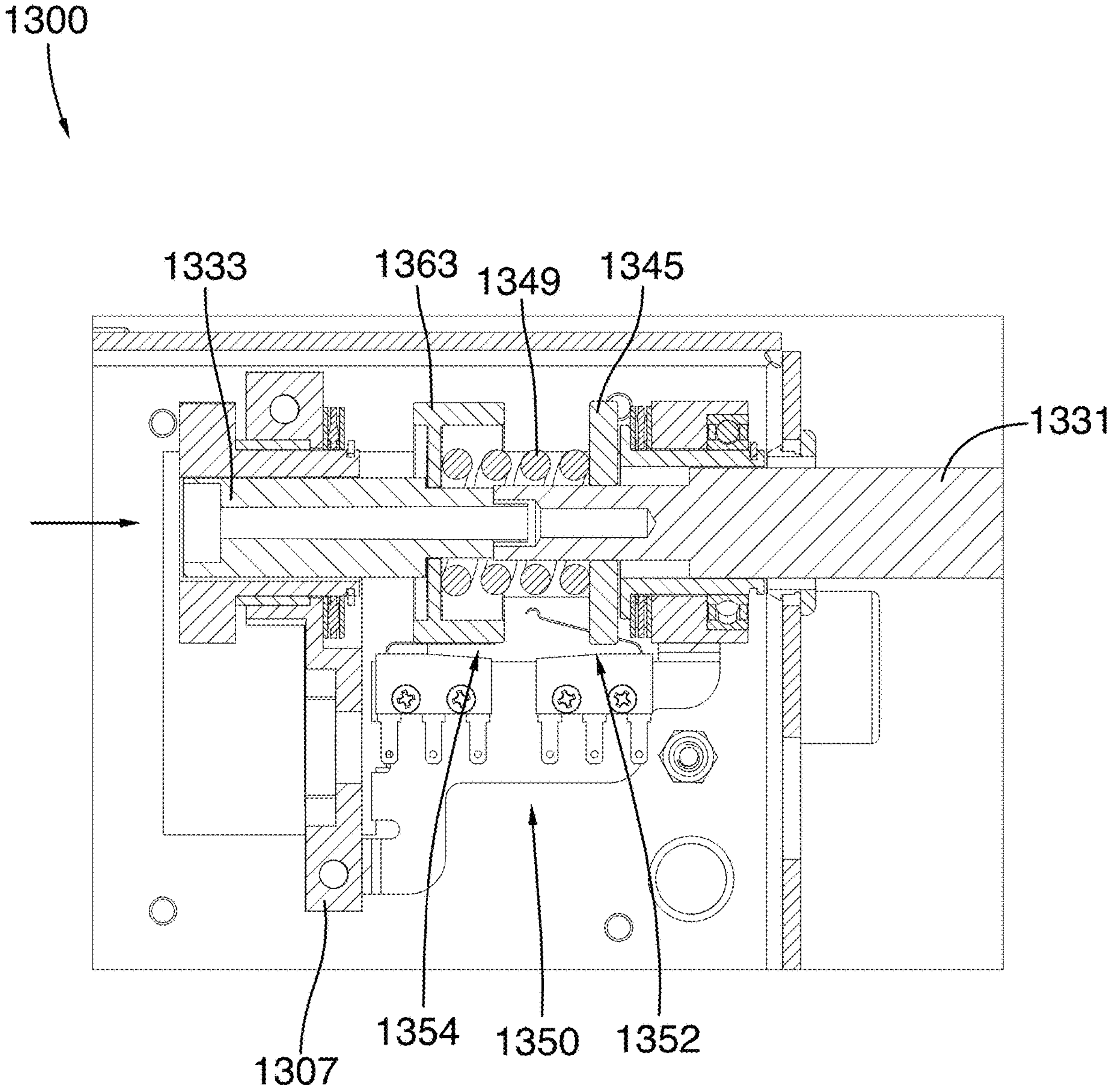
FIG. 13 is a cross-section view of the of the hospital bed with adjustable width illustrated in FIG. 7, showing details of a base casing including a coil spring in a inwardly compressed position.

Referring to FIGS. 12 and 13, the base casing 1300 further includes a stop circuit 1350 operatively connected to the actuator 260 for stopping the actuator 260 if the coil spring 1349 is compressed by a certain amount. In the illustrated embodiment, the stop circuit 1350 is disposed adjacent the extension shaft 1264 and includes a first limit switch 1352 disposed such as to be engaged by the first ring 1345 and a second limit switch 1354 disposed such as to be engaged by the flanged ring 1363.

When the coil spring 1349 is compressed in an outward position (shown in FIG. 12), the first ring 1345 moves towards the second wall 1304 and when the coil spring 1349 is compressed in an inward position (shown in FIG. 13), the flanged ring 1363 moves towards the first wall 1302.

As described above, the coil spring 1349 may remain compressed for a relatively short time and may be compressed by a relatively small amount or length. In other cases, the coil spring 1349 may be compressed by a relatively large amount or length, in which case it may be desirable to deactivate the actuator 1260 to avoid damaging the cables 252 and/or the actuator 1260 itself.

For example, the actuator 1260 may be extending to move the side panel sections 122*a*-122*d* or 123*a*-123*d* laterally away from the central panel sections 120*a*-120*d* (i.e. in the outward direction), but one or more of the side panel sections 122*a*-122*d* or 123*a*-123*d* may abut a wall and be prevented from moving laterally away from the central panel sections 120*a*-120*d*. In this case, the first ring 1345 would move towards the second wall 1304 of the base casing 1300, thereby compressing the coil spring 1349, and would keep moving towards the second wall 1304 until it triggers the first limit switch 1352, thereby deactivating the actuator 1260.

Conversely, the actuator 1260 may be retracting to move the side panel sections 122*a*-122*d* or 123*a*-123*d* laterally toward the central panel sections 120*a*-120*d* (i.e. in the inward direction), but one or more of the side panel sections 122*a*-122*d* or 123*a*-123*d* may be prevented from moving laterally toward the central panel sections 120*a*-120*d*, for instance because a patient is partially supported by one or more side panel sections 122*a*-122*d* or 123*a*-123*d*. In this case, the flanged ring 1363 would move towards the first wall 1302 of the base casing 1300, thereby compressing the coil spring 1349, and would keep moving towards the first wall 1302 until it triggers the second limit switch 1354, thereby deactivating the actuator 1260.

As it will be appreciated, the base casing 1300 provided with the stop circuit 1350 operates to restrict or limit the force applied by the operation of the handle 1500 or of the actuator 1260 in case one or more side panel sections 122*a*-122*d* or 123*a*-123*d* are prevented or restricted from moving laterally toward or away from the central panel sections 120*a*-120*d*. The base casing 1300 further acts as a safety mechanism for protecting components of the bed 100, such as the actuator 1260, the slide members 200, the sleeves 202, the cables 252 as well as the side panel sections 122*a*-122*d* or 123*a*-123*d*. More specifically, when the movement of one or more side panel sections 122*a*-122*d* or 123*a*-123*d* is restricted in either inward or outward direction, the limit switches 1352 or 1354 will be activated by the compression of the coil spring 1349, thus preventing the components of the bed 100 to be damaged or destructed by the activation of the actuator 1260.

Alternatively, the base casing 1300 may not include a stop circuit 1350.

In yet another embodiment, instead of being mounted to the extension shaft 1264, the coil springs could be mounted coaxially on one or more of the slide members 200 and allows slight movement of the slide member 200 relative to its corresponding side panel section 122*a*-122*d* or 123*a*-123*d*. In this embodiment, if a force is exerted on a side panel section 122*a*-122*d* or 123*a*-123*d*, only one or more coil springs coupled to this specific side panel section 122*a*-122*d* or 123*a*-123*d* could be compressed, while the other coil springs coupled to the other side panel sections 122*a*-122*d* or 123*a*-123*d* could remain uncompressed.

Figure 14:
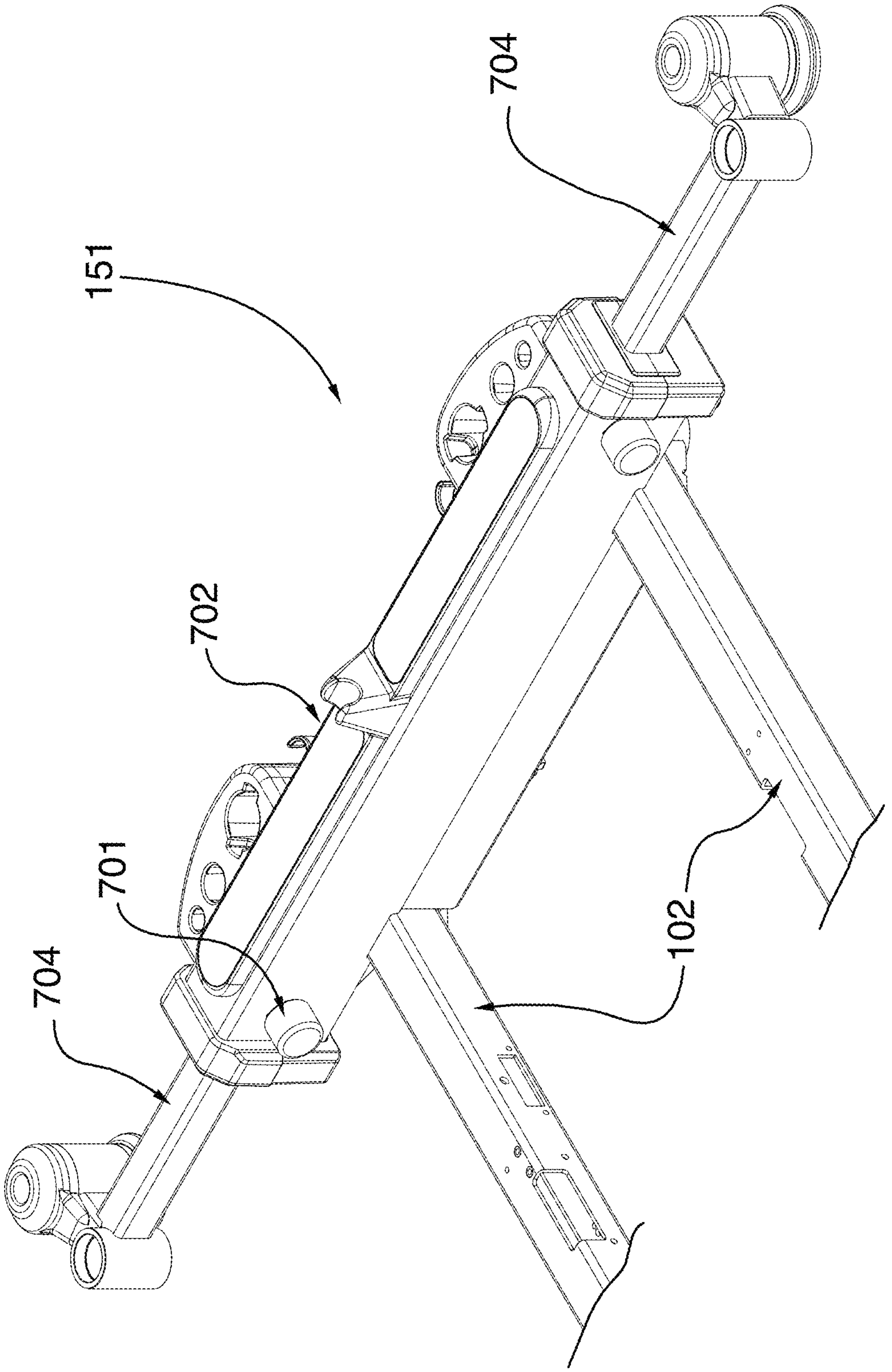
FIG. 14 is another top perspective view of the hospital bed with adjustable width shown in FIG. 1, enlarged to show a headboard extension member.
Figure 15:
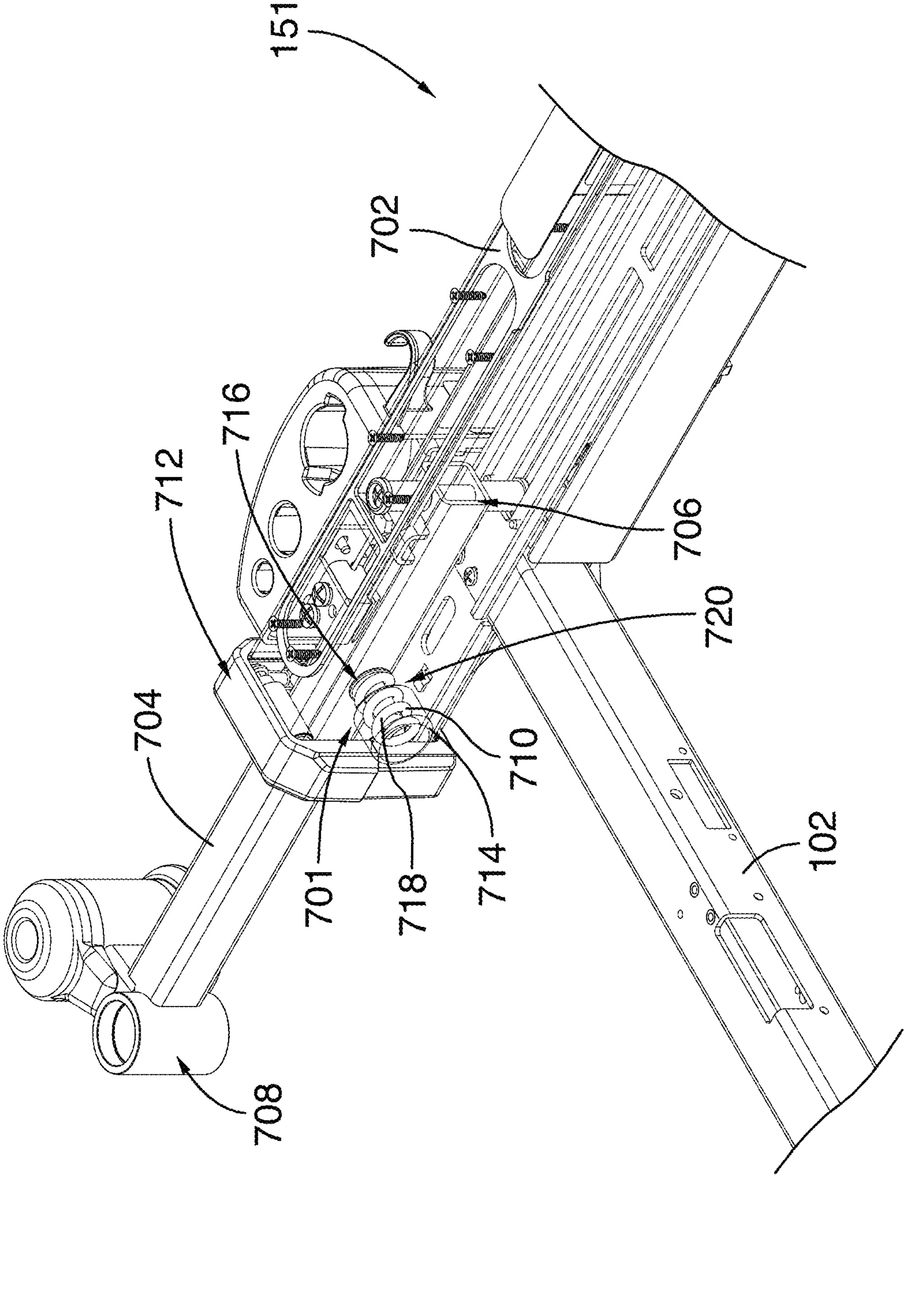
FIG. 15 is still another perspective view of the hospital bed with adjustable width shown in FIG. 1, enlarged similarly to FIG. 14 and made transparent to show the resilient element extending orthogonally to the headboard extension member.
Figure 16:
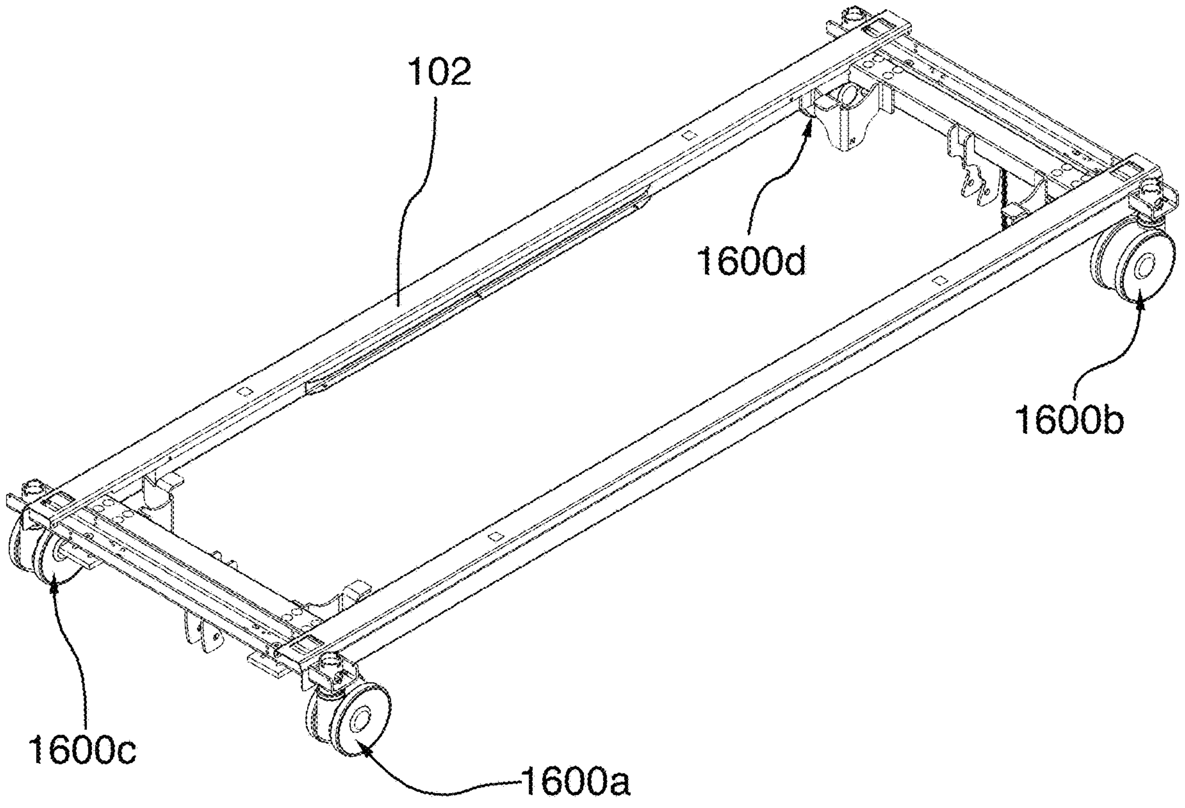
FIG. 16 is a top perspective view of the frame of the hospital bed shown in FIG. 1, showing a plurality of dual castor assemblies.

Now turning to FIGS. 14 and 15, the bed 100 further includes a headboard 150 and a footboard 152, best shown in FIGS. 1A to 2B. In the illustrated embodiment, both the headboard 150 and the footboard 152 comprise a support base 151 and 153, respectively, which headboard base 151 and footboard base 153, are adjustable in width. Moreover, the headboard base 151 and the footboard base 153 are generally similar, and therefore only the headboard base 151 will be described below. Alternatively, only the headboard base 151 or the footboard base 153 may have an adjustable width.

In the illustrated embodiment, the headboard base 151 includes a central sleeve 702 extending transversely to the bed 100 and a pair of headboard extension members 704 slidably received in the central sleeve 702 and extendable laterally towards and away from the central sleeve 702 to thereby respectively decrease and increase the headboard base's width. The bed 100 may further include a vertical panel 703, including a pair of headboard panel sections 705, 707 slidably movable relative to each other, each headboard panel section 705, 707 being connected to one of the headboard extension members 704 (shown in FIGS. 1B and 2B). In one embodiment, the headboard extension members 704 could be operatively connected to the transmission assembly 250.

In the illustrated embodiment, each headboard extension member 704 includes an inner end 706 located towards the central sleeve 702 and an outer end 708 located away from the central sleeve 702.

Still in the illustrated embodiment, the headboard 700 further includes at least one resilient member 701 operatively connected to the headboard extension member 704 near the inner end 706. Specifically, the at least one resilient member 701 includes a coil spring 710 having a central axis disposed orthogonally to the headboard extension member 704. In this configuration, when an external force is exerted on the outer end 708 of the headboard extension member 704 in a direction orthogonal to the headboard extension member 704, the headboard extension member 704 acts as a lever and creates a moment generally near the center of the headboard extension member 704, or generally near an outer end 712 of the central sleeve 702.

In the illustrated embodiment, the coil spring 710 is housed in a cylindrical housing 714 which extends from the central sleeve 702 near the outer end 712 of the sleeve 702. The coil spring 710 is also provided with a support element 716 which slidably connects the coil spring 710 to the headboard extension member 704. Specifically, the support element 716 includes a pin 718 extending longitudinally through the coil spring 710 and a generally circular sliding base 720 extending orthogonally to the pin 718 and adapted for sliding along the headboard extension member 704 when the headboard extension member 704 moves laterally within the central sleeve 702. In this configuration, the spring 710 remains laterally retained within the housing 714 as the headboard extension member 704 moves laterally within the sleeve 702.

In the illustrated embodiment, the headboard extension member 704 may have an outer cross-section which is slightly smaller than the inner cross-section of the sleeve 702 such that there is a slight play between the headboard extension member 704 and the sleeve 702. In this configuration, the coil spring 710 may press the headboard extension member 704 inside the sleeve 702 and therefore take up the play during normal operation of the headboard extension member 704. When an external force is applied on the outer end 708 of the headboard extension member 704, this configuration allows a slight angular movement of the headboard extension member 704 relative to the sleeve 702, and therefore prevents or at least reduces the bending in the headboard extension member 704.

In the illustrated embodiment, the coil spring 710 is disposed towards the footboard 152 such that the spring 710 is adapted to counteract an external force applied on the outer end 708 of the headboard extension member 704 away from the footboard 152. Alternatively, the spring 710 could be disposed away from the footboard to counteract an external force applied on the outer end 708 of the headboard extension member 704 towards the footboard 152. In yet another embodiment, the headboard 700 could include a first coil spring disposed towards the footboard 152 and a second coil spring disposed away from the footboard 152. It will be appreciated that instead of a coil spring, other types of springs may be used.

Turning now to FIGS. 16 to 19, the bed 100 is provided with a plurality of dual castor assemblies 1600*a*-1600*d* configured for absorbing vertical shocks, for instance when the bed 100 is inadvertently dropped vertically (for instance during transport or delivery) or when the bed hits a vertical bump such as a doorstep while traveling on a horizontal surface. The castors assemblies 1600*a*-1600*d* therefore contribute to reduce the stress on the various parts of the bed 100, including actuators used to control the angular position of the backrest 106, the lower body support panel 108 and/or the first and second core support panels 110, 112.

Figure 17:
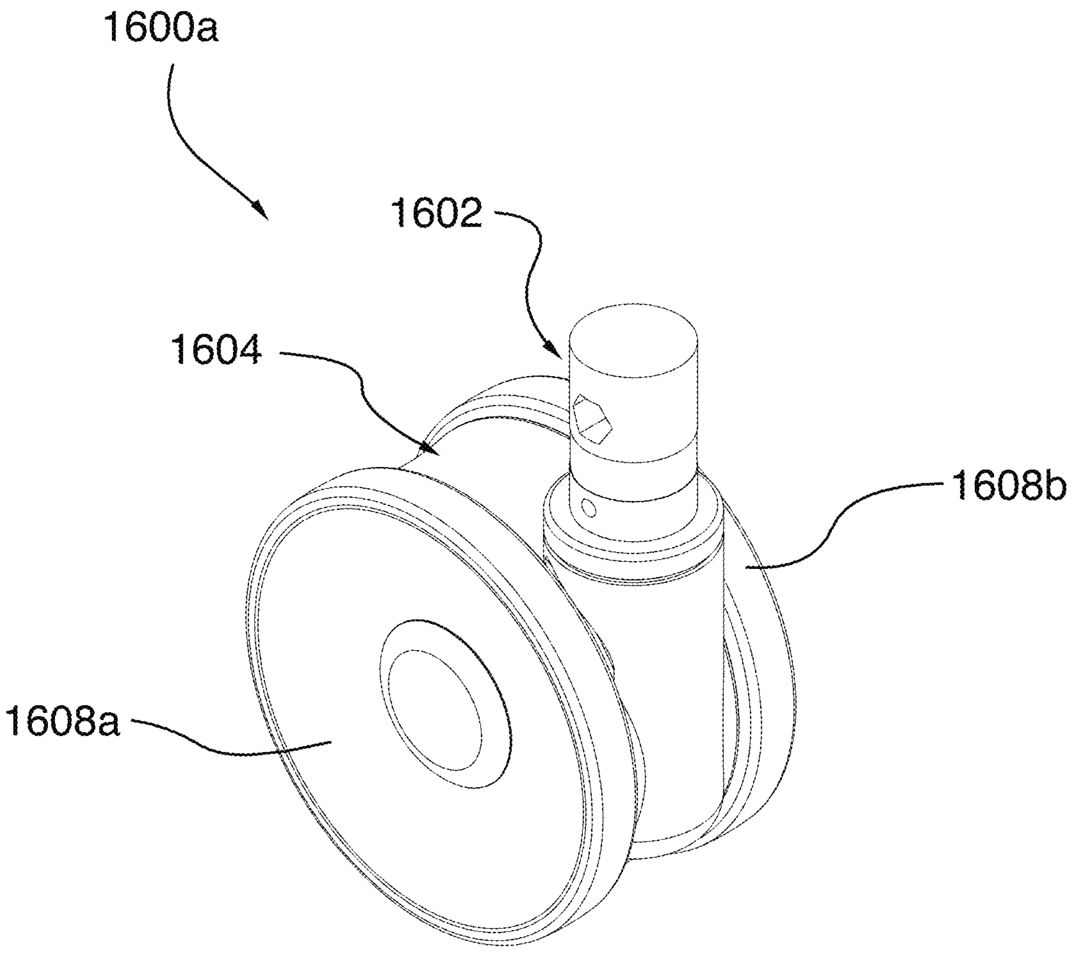
FIG. 17 is a perspective view of a dual castor assembly in accordance with one embodiment.
Figure 18:
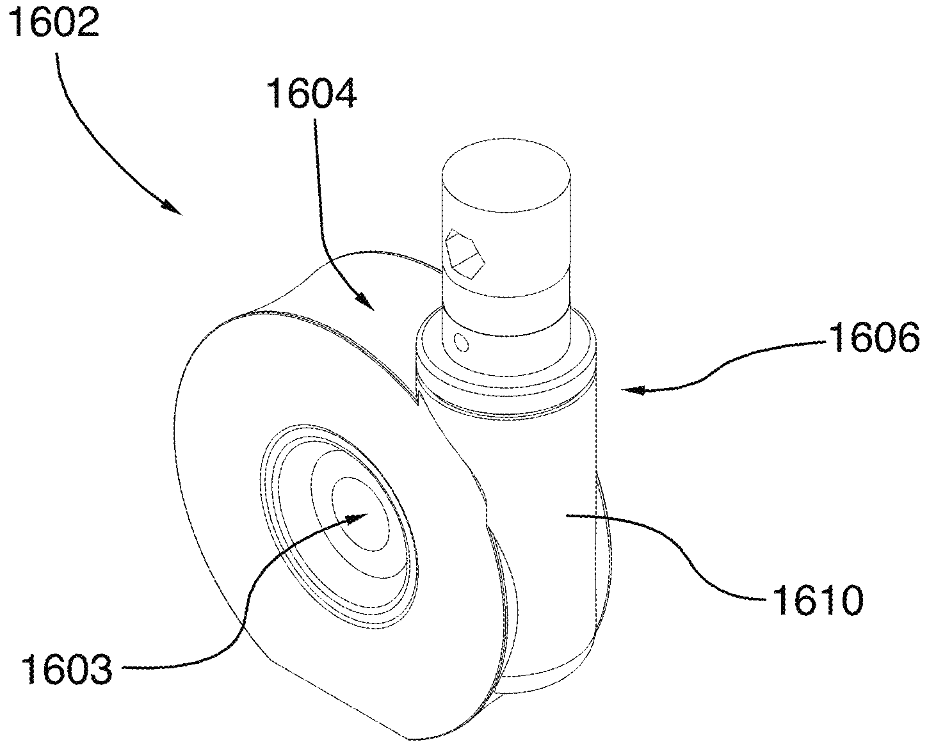
FIG. 18 is a perspective view of a wheel supporting portion of the dual wheel castor assembly shown in FIG. 17.
Figure 19:
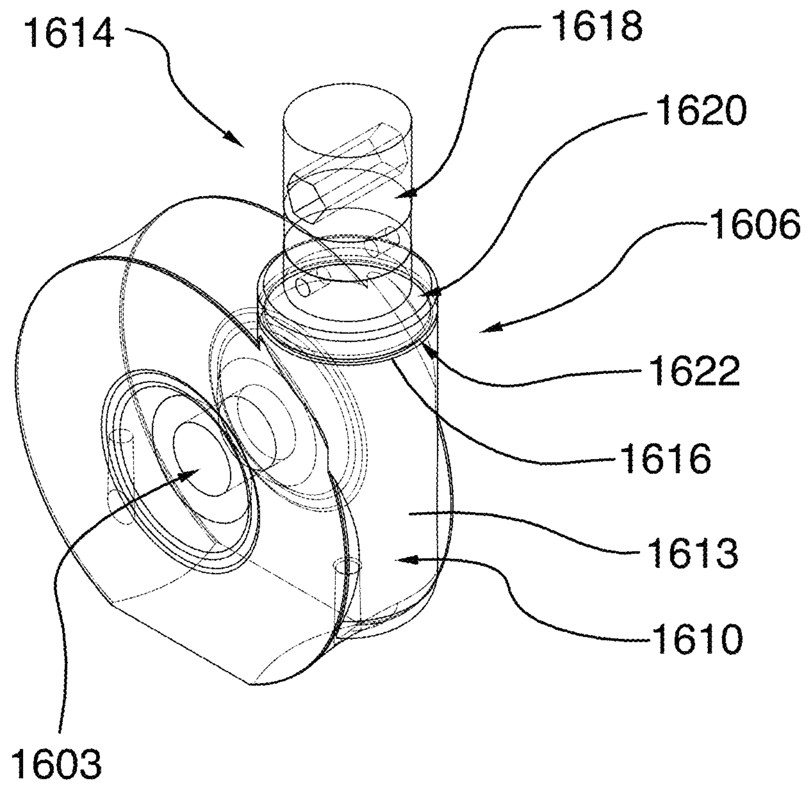
FIG. 19 is a perspective view of a wheel supporting portion of the dual wheel castor assembly similarly to FIG. 18, with the wheel supporting portion made transparent to show the resilient element.

The dual castors assemblies 1600*a*-1600*d* being identical, only dual castor assembly 1600*a* will be described. It will be appreciated that a similar description also applies to dual castor assemblies 1600*b*-1600*d*. In the illustrated embodiment, the dual castor assembly 1600*a* comprises a wheel base 1602 comprising a generally circular wheel supporting portion 1604 and a mounting portion 1606 for mounting the castor assembly 1600*a* to the frame 102 of the bed 100, as well as a pair of spaced-apart wheels 1608*a*-1608*b*. As best shown in FIG. 18, the wheel supporting portion 1604 comprises a hole 1603 for receiving therein a rotation shaft (not shown) for mounting the wheels 1608*a* and 1608*b* to the wheel receiving portion 1604. As best shown in FIG. 17, when the wheels 1608*a*-1608*b* are mounted to the wheel receiving portion 1604, the wheel receiving portion 1604 is sandwiched between the two wheels 1608*a*-1608*b*.

The mounting portion 1606 extends vertically and tangentially from the wheel receiving portion 1604. The mounting portion 1606 comprises a lower cylindrical portion 1610 integrally formed with the wheel receiving portion 1604 and defining a circular hole and a cylindrical wall 1613. The mounting portion 1606 also comprises a top portion 1614 sized and shaped to rotatably mount the wheel assembly 1600*a* to the frame 102 of the bed 100, and for allowing a rotation movement of the wheel assembly 1600*a* about a vertical axis while the bed 100 is moved.

In this regard, the top portion 1614 comprises a cylindrical internal segment 1616 configured to be received in the circular hole of the cylindrical portion 1610, a cylindrical external portion 1618 configured to be received in a corresponding circular hole defined on the frame 102 of the bed, and an annular lip 1620 dividing the cylindrical internal and external portions 1616 and 1618. Mounted to the cylindrical internal segment 1616, adjacent to the annular lip 1620 is a resilient element 1622. In the illustrated embodiment, the resilient element 1622 is an O-ring made of a rubber material, although it could be any type of resilient material such as, for instance, a spring. When the top portion 1614 is mounted to the lower cylindrical portion 1610 of the mounting portion 1606, the resilient element 1622 is sandwiched between the cylindrical wall 1613 of the cylindrical portion 1610 and the annular lip 1620. As such, when a vertical force is exerted suddenly and/or abruptly downwardly to the bed 100 or, conversely, upwardly on the wheel assembly 1600*a*, the resilient element 1622 will contribute the absorb the forces, thereby reducing the stress on the other element of the bed 100, such as, for instance, the various actuators.

While in the above described embodiment, the wheel assembly 1600*a* is a dual castor assembly, it will be understood that the resilient element 1622 could be used along with other types of wheel assemblies. For instance, it could be used with a castor comprising a single wheel. Alternatively, the mounting portion 1606 of the base 1602 could be configured differently, without departing from the scope of the embodiment.

While the above embodiments have been described in connection with a hospital bed, it will be understood that they could find use with any type of patient supporting apparatuses, including long-term care beds, stretchers, gurneys and hospital beds such as bariatric beds.

Although the foregoing description and accompanying drawings relate to specific preferred embodiments of the present invention as presently contemplated by the inventors, it will be understood that various changes, modifications and adaptations, may be made without departing from the spirit of the invention.

The invention claimed is:

1. A patient support apparatus comprising:

a frame;

a patient supporting surface supported on the frame, the patient supporting surface comprising a central panel section and a side panel section adapted to selectively extend towards and away from the central panel section for adjusting a width of the patient supporting surface;

a board supported on the frame, the board comprising a base comprising a sleeve and an extension member slidably received in the sleeve, wherein the sleeve comprises an outer end, and wherein the extension member comprises an inner end located towards the sleeve and an outer end located away from the sleeve, the extension member being extendable laterally toward and away from the sleeve for adjusting a width of the base; and a coil spring supported by the sleeve, the coil spring being adapted to counteract an external force applied to the outer end of the extension member.

2. The patient support apparatus of claim 1, wherein the coil spring extends along an axis intersecting the extension member and from a proximal end to a distal end away from the extension member.

3. The patient support apparatus of claim 2, further comprising a support element connecting the coil spring to the extension member, wherein the support element comprises a sliding base mounted to the proximal end of the coil spring, the sliding base being adapted to slide along the extension member when the extension member moves laterally within the sleeve.

4. The patient support apparatus of claim 3, wherein the support element comprises a pin extending through the coil spring.

5. The patient support apparatus of claim 1, comprising a base casing comprising a housing secured to the frame, a threaded rod threadably coupled to the housing such that rotation of the threaded rod causes lateral movement of the side panel section relative to the central panel section.

6. The patient support apparatus of claim 5, comprising first and second coil springs mounted to the threaded rod for damping movement of the side panel section relative to the central panel section.

7. The patient support apparatus of claim 6, comprising an abutment ring mounted to the threaded rod, wherein the first coil spring is sandwiched between a first wall of the base casing and the abutment ring and wherein the second coil spring is sandwiched between the abutment ring and a second wall of the base casing parallel to the first wall.

8. The patient support apparatus of claim 1, wherein the side panel section is a first side panel section located at a first side of the central panel section and wherein the patient support assembly comprises a second side panel section located at a second side of the central panel section and a movement transmission assembly, the movement transmission assembly comprising a transmission member connecting the first and second side panel sections for laterally moving the first and second side panel sections towards and away from the central panel section.

9. The patient support apparatus of claim 8, wherein the central panel section is a first central panel section, wherein the patient support assembly comprises a second central panel section, a third side panel section located at a first side of the second central panel section and a fourth side panel section located at a second side of the second central panel section, and wherein the transmission member connects the third and fourth side panel sections for laterally moving the third and fourth side panel sections towards and away from the second central panel section.

10. The patient support apparatus of claim 1, wherein the extension member has an outer cross-section that is slightly smaller than an inner cross-section of the sleeve and wherein a slight angular movement of the extension member relative to the sleeve is allowed while the coil spring counteracts the external force applied to the outer end of the extension member.

11. The patient support apparatus of claim 1, wherein the board comprises a vertical panel mounted to the base, the vertical panel being movable to follow movement of the extension member laterally towards and away from the sleeve.

12. The patient support apparatus of claim 1, wherein the extension member is a first extension member and wherein the base comprises a second extension member, the first and second extension members being extendable laterally towards and away from the sleeve in opposite directions.

13. The patient support apparatus of claim 12, wherein the board comprises a first vertical panel mounted to the first extension member and being movable to follow movement of the first extension member towards and away from the sleeve and a second vertical panel mounted to the second extension member and being movable to follow movement of the second extension member towards and away from the sleeve for adjusting a width of the board.

14. A patient support apparatus comprising:

a frame;

a patient supporting surface supported on the frame, the patient supporting surface comprising a central panel section and a side panel section adapted to selectively extend towards and away from the central panel section for adjusting a width of the patient supporting surface;

a board supported on the frame, the board comprising a base comprising a sleeve and an extension member slidably received in the sleeve, wherein the sleeve comprises an outer end, and wherein the extension member comprises an inner end located towards the sleeve and an outer end located away from the sleeve, the extension member being extendable laterally towards and away from the sleeve for adjusting a width of the base;

a coil spring supported by the sleeve;

wherein the extension member has an outer cross-section that is slightly smaller than an inner cross-section of the sleeve; and wherein, when an external force is applied to the outer end of the extension member, a slight angular movement of the extension member relative to the sleeve is allowed while the coil spring counteracts the external force.

15. The patient support apparatus of claim 14, wherein the coil spring extends along an axis intersecting the extension member and from a proximal end to distal end away from the extension member.

16. The patient support apparatus of claim 15, further comprising a support element connecting the coil spring to the extension member, wherein the support element comprises a sliding base mounted to the proximal end of the coil spring, the sliding base being adapted to slide along the extension member when the extension member moves laterally within the sleeve.

17. The patient support apparatus of claim 14, wherein the support element comprises a pin extending through the coil spring.

18. The patient support apparatus of claim 14, comprising a base casing comprising a housing secured to the frame, a threaded rod threadably coupled to the housing such that rotation of the threaded rod causes lateral movement of the side panel section relative to the central panel section.

19. The patient support apparatus of claim 18, comprising first and second coil springs mounted to the threaded rod for damping movement of the side panel section relative to the central panel section.

20. The patient support apparatus of claim 19, comprising an abutment ring mounted to the threaded rod, wherein the first coil spring is sandwiched between a first wall of the base casing and the abutment ring and wherein the second coil spring is sandwiched between the abutment ring and a second wall of the base casing parallel to the first wall.

21. The patient support apparatus of claim 14, wherein the side panel section is a first side panel section located at a first side of the central panel section and wherein the patient support assembly comprises a second side panel section located at a second side of the central panel section and a movement transmission assembly, the movement transmission assembly comprising a transmission member connecting the first and second side panel sections for laterally moving the first and second side panel sections towards and away from the central panel section.

22. The patient support apparatus of claim 21, wherein the central panel section is a first central panel section, wherein the patient support assembly comprises a second central panel section, a third side panel section located at a first side of the second central panel section and a fourth side panel section located at a second side of the second central panel section, and wherein the transmission member connects the third and fourth side panel sections for laterally moving the third and fourth side panel sections towards and away from the second central panel section.

23. The patient support apparatus of claim 14, wherein the board comprises a vertical panel mounted to the base, the vertical panel being movable to follow movements of the extension member laterally towards and away from the sleeve.

24. The patient support apparatus of claim 14, wherein the extension member is a first extension member and wherein the base comprises a second extension member, the first and second extension members being extendable laterally towards and away from the sleeve in opposite directions.

25. The patient support apparatus of claim 24, wherein the board comprises a first vertical panel mounted to the first extension member and being movable to follow movement of the first extension member towards and away from the sleeve and a second vertical panel mounted to the second extension member and being movable to follow movement of the second extension member towards and away from the sleeve for adjusting a width of the board.

26. A patient support apparatus comprising:

a frame;

a patient supporting surface supported on the frame, the patient supporting surface comprising a central panel section and first and second side panel sections adapted to selectively extend towards and away from the central panel section for adjusting a width of the patient supporting surface; and a board supported on the frame, the board comprising a base and a vertical panel mounted to the base, the base comprising a sleeve and an extension member slidably received in the sleeve, wherein the sleeve comprises an outer end, and wherein the extension member comprises an inner end located towards the sleeve and an outer end located away from the sleeve;

wherein the extension member is extendable laterally towards and away from the sleeve for adjusting a width of the base; and wherein the vertical panel is movable to follow movement of the extension member towards and away from the sleeve for adjusting a width of the board.

27. The patient support apparatus of claim 26, wherein the extension member is a first extension member and wherein the base comprises a second extension member, the first and second extension members being extendable laterally towards and away from the sleeve in opposite directions.

28. The patient support apparatus of claim 27, wherein the vertical panel is a first vertical panel mounted to the first extension member and being movable to follow movement of the first extension member towards and away from the sleeve, and wherein the patient support apparatus comprises a second vertical panel mounted to the second extension member and being movable to follow movement of the second extension member towards and away from the sleeve for adjusting a width of the board.

29. The patient support apparatus of claim 28, wherein a lateral movement of the first and second panel sections towards and away from the central panel corresponds to a lateral movement of the first and second vertical panels towards and away from the sleeve.

30. The patient support apparatus of claim 28, wherein a lateral movement of the first and second panel sections towards and away from the central panel is simultaneous to a lateral movement of the first and second vertical panels towards and away from the sleeve.

31. The patient support apparatus of claim 26, comprising a housing adjacent the outer end of the sleeve, a coil spring mounted in the housing and a support element that connects the coil spring to the extension member, the coil spring being adapted to counteract an external force applied to the outer end of the extension member.

32. The patient support apparatus of claim 31, wherein the extension member has an outer cross-section that is slightly smaller than an inner cross-section of the sleeve, and wherein, when the external force is applied to the outer end of the extension member, a slight angular movement of the extension member relative to the sleeve is allowed while the coil spring counteracts the external force.

33. A patient support apparatus comprising:

a frame;

a patient supporting surface supported on the frame; and a board supported on the frame, the board comprising a base comprising a sleeve and first and second extension members slidably received in the sleeve, a first vertical panel mounted to the first extension member and being movable to follow movement of the first extension member towards and away from the sleeve and a second vertical panel mounted to the second extension member and being movable to follow movement of the second extension member towards and away from the sleeve for adjusting a width of the board.

34. The patient support apparatus of claim 33, wherein the patient supporting surface comprises a central panel section and first and second side panel sections adapted to selectively extend towards and away from the central panel section for adjusting the width of the patient supporting surface.

35. The patient support apparatus of claim 34, comprising a movement transmission assembly comprising a transmission member connecting the first and second side panel sections for laterally moving the first and second side panel sections towards and away from the central panel section.

36. The patient support apparatus of claim 35, wherein the transmission member connects the first and second vertical panels for laterally moving the first and second vertical panels towards and away from the sleeve.

37. The patient support apparatus of claim 36, wherein a lateral movement of the first and second side panel sections towards and away from the central panel corresponds to a lateral movement of the first and second vertical panels towards and away from the sleeve.

38. The patient support apparatus of claim 36, wherein a lateral movement of the first and second side panel sections towards and away from the central panel is simultaneous to a lateral movement of the first and second vertical panels towards and away from the sleeve.

39. The patient support apparatus of claim 36, wherein the central panel section is a first central panel section, wherein the patient support assembly comprises a second central panel section, a third side panel section located at a first side of the second central panel section and a fourth side panel section located at a second side of the second central panel section, and wherein the transmission member connects the third and fourth side panel sections for laterally moving the third and fourth side panel sections towards and away from the second central panel section.

40. The patient support apparatus of claim 39, wherein a lateral movement of the first and second side panel sections towards and away from the first central panel section and a lateral movement of the third and fourth side panel sections towards and away from the second central panel section corresponds to a lateral movement of the first and second vertical panels towards and away from the sleeve.

41. The patient support apparatus of claim 39, wherein a lateral movement of the first and second side panel sections towards and away from the first central panel section and a lateral movement of the third and fourth side panel sections towards and away from the second central panel section is simultaneous to a lateral movement of the first and second vertical panels towards and away from the sleeve.

42. The patient support apparatus of claim 33, wherein the sleeve comprises first and second outer ends, wherein the first extension member comprises a first inner end located towards the sleeve and a second outer end located away from the sleeve, and wherein the second extension member comprises a second inner end located towards the sleeve and a second outer end located away from the sleeve.

43. The patient support apparatus of claim 42, comprising a housing adjacent one of the first and second ends of the sleeve, a coil spring mounted in the housing and a support element that connects the coil spring to one of the first and second extension members, the coil spring being adapted to counteract an external force applied to the one of the first and second outer ends of the one of the first and second extension members.

44. The patient support apparatus of claim 42, comprising a first housing adjacent the first end of the sleeve, a second housing adjacent the second end of the sleeve, a first coil spring mounted in the first housing and a first support element that connects the first coil spring to the first extension member, and a second coil spring mounted in the second housing and a second support element that connects the second coil spring to the second extension member, wherein the first coil spring is adapted to counteract an external force applied to the first outer end of the first extension member and/or wherein the second coil spring is adapted to counteract an external force applied to the second outer end of the second extension member.

45. The patient support apparatus of claim 33, wherein the board is a headboard or a footboard.

46. The patient support apparatus of claim 33, wherein the board is a headboard, wherein the patient support apparatus comprises a footboard comprising a foot base comprising a foot sleeve and first and second foot extension members slidably received in the foot sleeve, a first vertical foot panel mounted to the first foot extension member and being movable to follow movement of the first foot extension member towards and away from the foot sleeve and a second foot vertical panel mounted to the second foot extension member and being movable to follow movement of the second foot extension member towards and away from the foot sleeve for adjusting a width of the footboard.

* * * * *